(12) United States Patent
Perron et al.

(10) Patent No.: US 7,991,242 B2
(45) Date of Patent: Aug. 2, 2011

(54) APPARATUS, METHOD AND SYSTEM FOR SCREENING RECEPTACLES AND PERSONS, HAVING IMAGE DISTORTION CORRECTION FUNCTIONALITY

(75) Inventors: Luc Perron, Charlesbourg (CA); Michel R. Bouchard, Sainte-Foy (CA); Chen Xu, Sainte-Foy (CA); Sébastien Roy, Quebec (CA); Alain Bergeron, Sainte-Foy (CA); Eric Bergeron, Quebec (CA)

(73) Assignee: Optosecurity Inc., Quebec, Quebec (CA)

( * ) Notice: Subject to any disclaimer, the term of this patent is extended or adjusted under 35 U.S.C. 154(b) by 859 days.

(21) Appl. No.: 11/431,627

(22) Filed: May 11, 2006

(65) Prior Publication Data
US 2007/0041612 A1    Feb. 22, 2007

Related U.S. Application Data

(63) Continuation-in-part of application No. PCT/CA2005/000716, filed on May 11, 2005, and a continuation-in-part of application No. 11/268,749, filed on Nov. 8, 2005, now Pat. No. 7,734,102.

(51) Int. Cl.
*G06K 9/40* (2006.01)
*G06K 9/00* (2006.01)
(52) U.S. Cl. ........................ 382/275; 382/103
(58) Field of Classification Search ............ 382/275
See application file for complete search history.

(56) References Cited

U.S. PATENT DOCUMENTS

| 2,398,196 A * | 4/1946 | Sicular .................... 378/190 |
| 4,338,626 A | 7/1982 | Lemelson |
| 4,379,348 A | 4/1983 | Haas et al. |
| 4,383,327 A | 5/1983 | Kruger |
| 4,418,575 A | 12/1983 | Hundt et al. |
| 4,470,303 A | 9/1984 | O'Donnell |
| 4,480,899 A | 11/1984 | Sprague |
| 4,482,958 A | 11/1984 | Nakayama et al. |
| 4,509,075 A | 4/1985 | Simms et al. |
| 4,573,198 A | 2/1986 | Anderson |
| 4,612,666 A | 9/1986 | King |
| 4,637,056 A | 1/1987 | Sherman et al. |

(Continued)

FOREIGN PATENT DOCUMENTS

CA    2307439    5/2000

(Continued)

OTHER PUBLICATIONS

PCT/CA2008/000275 (ISR), Optosecurity Inc.

(Continued)

*Primary Examiner* — Brian P Werner
*Assistant Examiner* — Nirav G Patel

(57) ABSTRACT

A method and an apparatus suitable for screening a receptacle are provided. An image signal conveying an input image related to contents of the receptacle is received, the image signal having been produced by a device that is characterized by introducing distortion into the input image. A distortion correction process is applied to the image signal to remove at least part of the distortion from the input image, thereby to generate a corrected image signal conveying at least one corrected image. The corrected image signal is processed in combination with a plurality of data elements associated with a plurality of target objects in an attempt to detect a presence of at least one of the target objects in the receptacle. A detection signal is generated in response to detection of the presence of at least one target object in the receptacle.

61 Claims, 13 Drawing Sheets

U.S. PATENT DOCUMENTS

| | | | |
|---|---|---|---|
| 4,651,297 A | 3/1987 | Schlunt | |
| 4,653,109 A | 3/1987 | Lemelson et al. | |
| 4,722,096 A | 1/1988 | Dietrich et al. | |
| 4,724,543 A | 2/1988 | Klevecz et al. | |
| 4,725,733 A | 2/1988 | Horman et al. | |
| 4,736,399 A | 4/1988 | Okazaki | |
| 4,736,401 A | 4/1988 | Donges et al. | |
| 4,737,650 A | 4/1988 | West | |
| 4,756,015 A | 7/1988 | Doenges et al. | |
| 4,759,047 A | 7/1988 | Donges et al. | |
| 4,775,895 A | 10/1988 | Traupe et al. | |
| 4,783,794 A | 11/1988 | Dietrich | |
| 4,788,704 A | 11/1988 | Donges et al. | |
| 4,795,253 A | 1/1989 | Sandridge et al. | |
| 4,819,188 A | 4/1989 | Matsubara et al. | |
| 4,832,447 A | 5/1989 | Javidi | |
| 4,837,733 A | 6/1989 | Shiraishi et al. | |
| 4,838,644 A | 6/1989 | Ochoa et al. | |
| 4,841,554 A | 6/1989 | Doenges et al. | |
| 4,849,912 A | 7/1989 | Leberl et al. | |
| 4,862,358 A | 8/1989 | Kimura et al. | |
| 4,869,574 A | 9/1989 | Hartman | |
| 4,870,670 A | 9/1989 | Geus | |
| 4,884,289 A | 11/1989 | Glockmann et al. | |
| 4,887,899 A | 12/1989 | Hung | |
| 4,916,722 A | 4/1990 | Ema | |
| 4,955,060 A | 9/1990 | Katsuki et al. | |
| 5,003,616 A | 3/1991 | Orita et al. | |
| 5,018,178 A | 5/1991 | Katsumata | |
| 5,020,111 A | 5/1991 | Weber | |
| 5,022,062 A | 6/1991 | Annis | |
| 5,034,812 A | 7/1991 | Rawlings | |
| 5,041,993 A | 8/1991 | Rawlings | |
| 5,056,130 A | 10/1991 | Engel | |
| 5,060,249 A | 10/1991 | Eisen et al. | |
| 5,063,602 A | 11/1991 | Peppers et al. | |
| 5,065,418 A | 11/1991 | Bermbach et al. | |
| 5,073,782 A | 12/1991 | Huguenin et al. | |
| 5,079,698 A | 1/1992 | Grenier et al. | |
| 5,091,924 A | 2/1992 | Bermbach et al. | |
| 5,107,351 A | 4/1992 | Leib et al. | |
| 5,109,276 A | 4/1992 | Nudelman et al. | |
| 5,132,811 A | 7/1992 | Iwaki et al. | |
| 5,132,842 A | 7/1992 | Yeh | |
| 5,132,998 A | 7/1992 | Tsutsui et al. | |
| 5,138,167 A | 8/1992 | Barnes | |
| 5,150,229 A | 9/1992 | Takesue et al. | |
| 5,179,581 A | 1/1993 | Annis | |
| 5,181,234 A | 1/1993 | Smith | |
| 5,198,669 A | 3/1993 | Namiki et al. | |
| 5,216,541 A | 6/1993 | Takesue et al. | |
| 5,239,595 A | 8/1993 | Takemura et al. | |
| 5,257,085 A | 10/1993 | Ulich et al. | |
| 5,257,322 A | 10/1993 | Matsuoka et al. | |
| 5,268,967 A | 12/1993 | Jang et al. | |
| 5,283,641 A | 2/1994 | Lemelson | |
| 5,297,222 A | 3/1994 | Mori et al. | |
| 5,309,244 A | 5/1994 | Katagiri et al. | |
| 5,309,523 A | 5/1994 | Iwaki et al. | |
| 5,311,359 A | 5/1994 | Lucas et al. | |
| 5,319,547 A | 6/1994 | Krug et al. | |
| 5,323,472 A | 6/1994 | Falk | |
| 5,327,286 A | 7/1994 | Sampsell et al. | |
| 5,345,081 A | 9/1994 | Rogers | |
| 5,345,173 A | 9/1994 | Bito et al. | |
| 5,365,560 A | 11/1994 | Tam | |
| 5,365,564 A | 11/1994 | Yashida et al. | |
| 5,367,552 A | 11/1994 | Peschmann | |
| 5,371,542 A | 12/1994 | Pauli et al. | |
| 5,375,156 A | 12/1994 | Kuo-Petravic et al. | |
| 5,376,796 A | 12/1994 | Chan et al. | |
| 5,379,334 A | 1/1995 | Zimmer et al. | |
| 5,379,336 A | 1/1995 | Kramer et al. | |
| 5,418,380 A | 5/1995 | Simon et al. | |
| 5,420,788 A | 5/1995 | Vissers | |
| 5,425,113 A | 6/1995 | Ito | |
| 5,428,657 A | 6/1995 | Papanicolopoulos et al. | |
| 5,430,787 A | 7/1995 | Norton | |
| 5,481,584 A | 1/1996 | Tang et al. | |
| 5,481,622 A | 1/1996 | Gerhardt et al. | |
| 5,483,569 A | 1/1996 | Annis | |
| 5,485,312 A | 1/1996 | Horner et al. | |
| 5,490,218 A | 2/1996 | Krug et al. | |
| 5,493,444 A | 2/1996 | Khoury et al. | |
| 5,506,880 A | 4/1996 | Scardino et al. | |
| 5,519,225 A | 5/1996 | Mohr et al. | |
| 5,524,133 A | 6/1996 | Neale et al. | |
| 5,528,702 A | 6/1996 | Mitsuoka et al. | |
| 5,528,703 A | 6/1996 | Lee | |
| 5,546,189 A | 8/1996 | Svetkoff et al. | |
| 5,568,256 A | 10/1996 | Korner et al. | |
| 5,580,471 A | 12/1996 | Fukumoto et al. | |
| 5,595,767 A | 1/1997 | Cinquin et al. | |
| 5,600,303 A | 2/1997 | Husseiny et al. | |
| 5,600,485 A | 2/1997 | Iwaki et al. | |
| 5,600,700 A | 2/1997 | Krug et al. | |
| 5,604,634 A | 2/1997 | Khoury et al. | |
| 5,619,596 A | 4/1997 | Iwaki et al. | |
| 5,625,192 A | 4/1997 | Oda et al. | |
| 5,625,717 A | 4/1997 | Hashimoto et al. | |
| 5,638,420 A | 6/1997 | Armistead | |
| 5,642,393 A | 6/1997 | Krug et al. | |
| 5,642,394 A | 6/1997 | Rothschild | |
| 5,647,018 A | 7/1997 | Benjamin | |
| 5,664,574 A | 9/1997 | Chance | |
| 5,668,846 A | 9/1997 | Fox et al. | |
| 5,680,525 A | 10/1997 | Sakai et al. | |
| 5,684,565 A | 11/1997 | Oshida et al. | |
| 5,692,028 A | 11/1997 | Geus et al. | |
| 5,692,029 A | 11/1997 | Husseiny et al. | |
| 5,692,446 A | 12/1997 | Becker et al. | |
| 5,699,400 A | 12/1997 | Lee et al. | |
| 5,703,921 A | 12/1997 | Fujita et al. | |
| 5,706,816 A | 1/1998 | Mochizuki et al. | |
| 5,726,449 A | 3/1998 | Yoshiike et al. | |
| 5,739,539 A | 4/1998 | Wang et al. | |
| 5,745,542 A | 4/1998 | Gordon et al. | |
| 5,748,305 A | 5/1998 | Shimono et al. | |
| 5,748,697 A | 5/1998 | Tam | |
| 5,754,621 A | 5/1998 | Suzuki et al. | |
| 5,756,875 A | 5/1998 | Parker et al. | |
| 5,757,981 A | 5/1998 | Kawakubo | |
| 5,761,334 A | 6/1998 | Nakajima et al. | |
| 5,764,683 A | 6/1998 | Swift et al. | |
| 5,764,719 A | 6/1998 | Noettling | |
| 5,768,334 A | 6/1998 | Maitrejean et al. | |
| 5,777,742 A | 7/1998 | Marron | |
| 5,778,046 A | 7/1998 | Molloi et al. | |
| 5,779,641 A | 7/1998 | Hatfield et al. | |
| 5,784,429 A | 7/1998 | Arai | |
| 5,786,597 A | 7/1998 | Lingren et al. | |
| 5,787,145 A | 7/1998 | Geus | |
| 5,794,788 A | 8/1998 | Massen | |
| 5,796,802 A | 8/1998 | Gordon | |
| 5,796,868 A | 8/1998 | Dutta-Choudhury | |
| 5,799,100 A | 8/1998 | Clarke et al. | |
| 5,800,355 A | 9/1998 | Hasegawa | |
| 5,802,133 A | 9/1998 | Kawai et al. | |
| 5,809,171 A | 9/1998 | Neff et al. | |
| 5,815,198 A | 9/1998 | Vachtsevanos et al. | |
| 5,815,264 A | 9/1998 | Reed et al. | |
| 5,828,722 A | 10/1998 | Ploetz et al. | |
| 5,828,774 A | 10/1998 | Wang | |
| 5,834,153 A | 11/1998 | Hasegawa et al. | |
| 5,838,758 A | 11/1998 | Krug et al. | |
| 5,838,759 A * | 11/1998 | Armistead | 378/57 |
| 5,841,828 A | 11/1998 | Gordon et al. | |
| 5,841,907 A | 11/1998 | Javidi et al. | |
| 5,850,465 A | 12/1998 | Shimura et al. | |
| 5,862,198 A | 1/1999 | Samarasekera et al. | |
| 5,862,258 A | 1/1999 | Taylor | |
| 5,864,598 A | 1/1999 | Hsieh et al. | |
| 5,866,907 A | 2/1999 | Drukier et al. | |
| 5,877,849 A | 3/1999 | Ramer et al. | |
| 5,881,123 A | 3/1999 | Tam | |
| 5,893,095 A | 4/1999 | Jain et al. | |
| 5,894,345 A | 4/1999 | Takamoto et al. | |

| | | | |
|---|---|---|---|
| 5,901,196 A | 5/1999 | Sauer et al. | |
| 5,901,198 A | 5/1999 | Crawford et al. | |
| 5,903,623 A | 5/1999 | Swift et al. | |
| 5,909,285 A | 6/1999 | Beaty et al. | |
| 5,909,477 A | 6/1999 | Crawford et al. | |
| 5,910,765 A | 6/1999 | Slemon et al. | |
| 5,910,973 A | 6/1999 | Grodzins | |
| 5,911,139 A | 6/1999 | Jain et al. | |
| 5,917,190 A | 6/1999 | Yodh et al. | |
| 5,926,568 A | 7/1999 | Chaney et al. | |
| 5,940,468 A | 8/1999 | Huang et al. | |
| 5,943,388 A | 8/1999 | Tumer | |
| 5,951,474 A | 9/1999 | Matsunaga et al. | |
| 5,953,452 A | 9/1999 | Boone et al. | |
| 5,960,104 A | 9/1999 | Conners et al. | |
| 5,974,111 A | 10/1999 | Krug et al. | |
| 5,978,440 A | 11/1999 | Kang et al. | |
| 5,981,949 A | 11/1999 | Leahy et al. | |
| 5,987,095 A | 11/1999 | Chapman et al. | |
| 6,005,916 A | 12/1999 | Johnson et al. | |
| 6,008,496 A | 12/1999 | Winefordner et al. | |
| 6,009,142 A | 12/1999 | Sauer et al. | |
| 6,011,620 A | 1/2000 | Sites et al. | |
| 6,018,561 A | 1/2000 | Tam | |
| 6,018,562 A | 1/2000 | Willson | |
| 6,031,890 A | 2/2000 | Bermbach et al. | |
| 6,035,014 A | 3/2000 | Hiraoglu et al. | |
| 6,043,870 A | 3/2000 | Chen | |
| 6,049,381 A | 4/2000 | Reintjes et al. | |
| 6,057,761 A | 5/2000 | Yukl | |
| 6,057,909 A | 5/2000 | Yahav et al. | |
| 6,058,159 A | 5/2000 | Conway et al. | |
| 6,060,677 A | 5/2000 | Ulrichsen et al. | |
| 6,070,583 A | 6/2000 | Perelman et al. | |
| 6,075,591 A | 6/2000 | Vokhmin | |
| 6,075,880 A | 6/2000 | Kollhof et al. | |
| 6,078,638 A | 6/2000 | Sauer et al. | |
| 6,080,994 A | 6/2000 | Carrott et al. | |
| 6,081,580 A | 6/2000 | Grodzins et al. | |
| 6,084,939 A | 7/2000 | Tamura | |
| 6,088,423 A | 7/2000 | Krug et al. | |
| 6,094,472 A | 7/2000 | Smith | |
| 6,097,427 A | 8/2000 | Dey et al. | |
| 6,097,483 A | 8/2000 | Komatsu | |
| 6,149,300 A | 11/2000 | Greenway et al. | |
| 6,153,873 A | 11/2000 | Wolf | |
| 6,155,179 A | 12/2000 | Aust et al. | |
| 6,157,730 A | 12/2000 | Roever et al. | |
| 6,163,403 A | 12/2000 | Carrott et al. | |
| 6,175,417 B1 | 1/2001 | Do et al. | |
| 6,175,613 B1 | 1/2001 | Boutenko et al. | |
| 6,185,272 B1 | 2/2001 | Hiraoglu et al. | |
| 6,188,747 B1 | 2/2001 | Geus et al. | |
| 6,195,413 B1 | 2/2001 | Geus et al. | |
| 6,195,444 B1 | 2/2001 | Simanovsky et al. | |
| 6,198,795 B1 | 3/2001 | Naumann et al. | |
| 6,205,195 B1 | 3/2001 | Lanza | |
| 6,205,243 B1 | 3/2001 | Migdal et al. | |
| 6,218,943 B1 * | 4/2001 | Ellenbogen | 340/572.4 |
| 6,222,902 B1 | 4/2001 | Lin et al. | |
| 6,229,872 B1 | 5/2001 | Amos | |
| 6,233,303 B1 | 5/2001 | Tam | |
| 6,236,704 B1 | 5/2001 | Navab et al. | |
| 6,236,708 B1 | 5/2001 | Lin et al. | |
| 6,249,341 B1 | 6/2001 | Basiji et al. | |
| 6,252,929 B1 | 6/2001 | Swift et al. | |
| 6,256,370 B1 | 7/2001 | Yavuz | |
| 6,256,404 B1 | 7/2001 | Gordon et al. | |
| 6,263,044 B1 | 7/2001 | Joosten | |
| 6,263,231 B1 | 7/2001 | Reitter | |
| 6,272,204 B1 | 8/2001 | Amtower et al. | |
| 6,272,233 B1 | 8/2001 | Takeo | |
| 6,278,760 B1 | 8/2001 | Ogawa et al. | |
| 6,288,974 B1 | 9/2001 | Nelson | |
| 6,289,235 B1 | 9/2001 | Webber et al. | |
| 6,292,260 B1 | 9/2001 | Lin et al. | |
| 6,292,530 B1 | 9/2001 | Yavus et al. | |
| 6,292,533 B1 | 9/2001 | Swift et al. | |
| 6,324,245 B1 | 11/2001 | Tam | |
| 6,335,742 B1 | 1/2002 | Takemoto | |
| 6,353,673 B1 | 3/2002 | Shnitser et al. | |
| 6,366,638 B1 | 4/2002 | Hsieh et al. | |
| 6,370,222 B1 | 4/2002 | Cornick | |
| 6,373,916 B1 | 4/2002 | Inoue et al. | |
| 6,373,970 B1 | 4/2002 | Dong et al. | |
| 6,373,979 B1 | 4/2002 | Wang | |
| 6,381,297 B1 | 4/2002 | Hsieh | |
| 6,388,788 B1 | 5/2002 | Harris et al. | |
| 6,403,960 B1 | 6/2002 | Wellnitz et al. | |
| 6,404,841 B1 | 6/2002 | Pforr et al. | |
| 6,408,042 B1 | 6/2002 | Hsieh | |
| 6,415,012 B1 | 7/2002 | Taguchi et al. | |
| 6,418,184 B1 | 7/2002 | Wang et al. | |
| 6,418,189 B1 | 7/2002 | Schafer | |
| 6,424,692 B1 | 7/2002 | Suzuki | |
| 6,442,288 B1 | 8/2002 | Haerer et al. | |
| 6,445,765 B1 | 9/2002 | Frank et al. | |
| 6,448,545 B1 | 9/2002 | Chen | |
| 6,453,003 B1 | 9/2002 | Springer et al. | |
| 6,459,755 B1 | 10/2002 | Li | |
| 6,463,181 B2 | 10/2002 | Duarte | |
| 6,473,489 B2 | 10/2002 | Bani-Hashemi et al. | |
| 6,477,221 B1 | 11/2002 | Ning | |
| 6,480,285 B1 | 11/2002 | Hill | |
| 6,480,564 B1 | 11/2002 | Kim et al. | |
| 6,483,894 B2 | 11/2002 | Hartick et al. | |
| 6,487,307 B1 | 11/2002 | Hennessey et al. | |
| 6,502,984 B2 | 1/2003 | Ogura et al. | |
| 6,507,025 B1 | 1/2003 | Verbinski et al. | |
| 6,507,278 B1 | 1/2003 | Brunetti et al. | |
| 6,525,331 B1 | 2/2003 | Ngoi et al. | |
| 6,526,120 B1 | 2/2003 | Gray et al. | |
| 6,532,276 B1 | 3/2003 | Hartick et al. | |
| 6,542,574 B2 | 4/2003 | Grodzins | |
| 6,542,578 B2 | 4/2003 | Ries et al. | |
| 6,542,579 B1 | 4/2003 | Takasawa | |
| 6,542,580 B1 | 4/2003 | Carver et al. | |
| 6,542,628 B1 | 4/2003 | Muller et al. | |
| 6,549,683 B1 | 4/2003 | Bergeron et al. | |
| 6,552,809 B1 | 4/2003 | Bergeron et al. | |
| 6,559,769 B2 | 5/2003 | Anthony et al. | |
| 6,570,177 B1 | 5/2003 | Struckhoff et al. | |
| 6,570,708 B1 | 5/2003 | Bergeron et al. | |
| 6,570,951 B1 | 5/2003 | Hsieh | |
| 6,570,956 B1 | 5/2003 | Rhee et al. | |
| 6,574,296 B2 | 6/2003 | Stierstorfer | |
| 6,574,297 B2 | 6/2003 | Tam | |
| 6,580,777 B1 | 6/2003 | Ueki et al. | |
| 6,580,778 B2 | 6/2003 | Meder | |
| 6,583,895 B1 | 6/2003 | Kuwahara et al. | |
| 6,584,170 B2 | 6/2003 | Aust et al. | |
| 6,586,193 B2 | 7/2003 | Yguerabide et al. | |
| 6,587,575 B1 | 7/2003 | Windham et al. | |
| 6,587,595 B1 | 7/2003 | Henkel et al. | |
| 6,597,760 B2 | 7/2003 | Beneke et al. | |
| 6,603,536 B1 | 8/2003 | Hasson et al. | |
| 6,608,921 B1 | 8/2003 | Inoue et al. | |
| 6,611,575 B1 | 8/2003 | Alyassin et al. | |
| 6,618,466 B1 | 9/2003 | Ning | |
| 6,621,887 B2 | 9/2003 | Albagli et al. | |
| 6,621,888 B2 | 9/2003 | Grodzins et al. | |
| 6,621,925 B1 | 9/2003 | Ohmori et al. | |
| 6,628,982 B1 | 9/2003 | Thomas et al. | |
| 6,628,983 B1 | 9/2003 | Gagnon | |
| 6,654,443 B1 | 11/2003 | Hoffman | |
| 6,663,280 B2 | 12/2003 | Doenges | |
| 6,665,373 B1 | 12/2003 | Kotowski et al. | |
| 6,707,879 B2 | 3/2004 | McClelland et al. | |
| 6,714,623 B2 | 3/2004 | Sako et al. | |
| 6,721,387 B1 | 4/2004 | Naidu et al. | |
| 6,721,391 B2 | 4/2004 | McClelland et al. | |
| 6,724,922 B1 | 4/2004 | Vilsmeier | |
| 6,731,819 B1 | 5/2004 | Fukushima et al. | |
| 6,735,274 B1 | 5/2004 | Zahavi et al. | |
| 6,735,279 B1 | 5/2004 | Jacobs et al. | |
| 6,738,450 B1 | 5/2004 | Barford | |
| 6,744,909 B1 | 6/2004 | Kostrzewski et al. | |
| 6,746,864 B1 | 6/2004 | McNeil et al. | |

| Patent/Pub No. | Date | Name |
|---|---|---|
| 6,751,349 B2 | 6/2004 | Matama |
| 6,754,374 B1 | 6/2004 | Miller et al. |
| 6,763,148 B1 | 7/2004 | Sternberg et al. |
| 6,785,410 B2 | 8/2004 | Vining et al. |
| H2110 H | 10/2004 | Newman |
| 6,801,647 B1 | 10/2004 | Arakawa |
| 6,803,997 B2 | 10/2004 | Stanek |
| 6,804,412 B1 | 10/2004 | Wilkinson |
| 6,813,395 B1 | 11/2004 | Kinjo |
| 6,825,854 B1 | 11/2004 | Beneke et al. |
| 6,837,422 B1 | 1/2005 | Meder |
| 6,839,403 B1 | 1/2005 | Kotowski et al. |
| 6,839,406 B2 | 1/2005 | Ries et al. |
| 6,843,599 B2 | 1/2005 | Le et al. |
| 6,856,272 B2 | 2/2005 | Levitan et al. |
| 6,865,287 B1 | 3/2005 | Beneke |
| 6,865,509 B1 | 3/2005 | Hsiung et al. |
| 6,868,138 B2 | 3/2005 | Clinthorne et al. |
| 6,873,261 B2 | 3/2005 | Anthony et al. |
| 6,876,322 B2 | 4/2005 | Keller |
| 6,895,072 B2 | 5/2005 | Schrock et al. |
| 6,895,338 B2 | 5/2005 | Hsiung et al. |
| 6,899,540 B1 | 5/2005 | Neiderman et al. |
| 6,918,541 B2 | 7/2005 | Knowles et al. |
| 6,928,141 B2 | 8/2005 | Carver et al. |
| 6,936,828 B2 | 8/2005 | Saccomanno |
| 6,938,488 B2 | 9/2005 | Diaz et al. |
| 6,940,943 B2 | 9/2005 | Claus et al. |
| 6,950,492 B2 | 9/2005 | Besson |
| 6,952,163 B2 | 10/2005 | Huey et al. |
| 6,970,531 B2 | 11/2005 | Eberhard et al. |
| 6,980,681 B1 | 12/2005 | Hsieh |
| 6,982,643 B2 | 1/2006 | Garfinkle |
| 6,990,171 B2 | 1/2006 | Toth et al. |
| 7,000,827 B2 | 2/2006 | Meder |
| 7,012,256 B1 | 3/2006 | Roos et al. |
| 7,020,241 B2 | 3/2006 | Beneke et al. |
| 7,043,474 B2 | 5/2006 | Mojsilovic et al. |
| 7,045,787 B1 | 5/2006 | Verbinski et al. |
| 7,046,761 B2 | 5/2006 | Ellenbogen et al. |
| 7,050,616 B2 | 5/2006 | Hsieh et al. |
| 7,062,074 B1 | 6/2006 | Beneke |
| 7,065,175 B2 | 6/2006 | Green |
| 7,068,751 B2 | 6/2006 | Toth et al. |
| 7,092,485 B2 | 8/2006 | Kravis |
| 7,098,461 B2 | 8/2006 | Endo |
| 7,099,004 B2 | 8/2006 | Masten |
| 7,099,432 B2 | 8/2006 | Ichihara et al. |
| 7,100,165 B2 | 8/2006 | Eldridge et al. |
| 7,103,137 B2 | 9/2006 | Seppi et al. |
| 7,105,828 B2 | 9/2006 | Unger et al. |
| 7,116,749 B2 | 10/2006 | Besson |
| 7,130,456 B2 | 10/2006 | Hillmann |
| 7,136,716 B2 | 11/2006 | Hsiung et al. |
| 7,139,406 B2 | 11/2006 | McClelland et al. |
| 7,142,633 B2 | 11/2006 | Eberhard et al. |
| 7,154,650 B2 | 12/2006 | Lettington |
| 7,164,750 B2 | 1/2007 | Nabors et al. |
| 7,183,906 B2 | 2/2007 | Zanovitch et al. |
| 7,193,515 B1 | 3/2007 | Roberts et al. |
| 7,212,113 B2 | 5/2007 | Zanovitch |
| 7,212,661 B2 | 5/2007 | Samara et al. |
| 7,233,682 B2 | 6/2007 | Levine |
| 7,244,941 B2 | 7/2007 | Roos et al. |
| 7,253,766 B2 | 8/2007 | Foote et al. |
| 7,257,189 B2 | 8/2007 | Modica et al. |
| 2001/0016030 A1 | 8/2001 | Nicolas et al. |
| 2001/0021013 A1 | 9/2001 | Hecht et al. |
| 2001/0021244 A1 | 9/2001 | Suzuki et al. |
| 2001/0028696 A1 | 10/2001 | Yamada et al. |
| 2001/0033636 A1 | 10/2001 | Hartick et al. |
| 2001/0038681 A1 | 11/2001 | Stanton et al. |
| 2001/0038705 A1 | 11/2001 | Rubbert et al. |
| 2001/0038707 A1 | 11/2001 | Ohara |
| 2001/0048734 A1 | 12/2001 | Uppaluri et al. |
| 2001/0053197 A1 | 12/2001 | Murayama et al. |
| 2002/0001366 A1 | 1/2002 | Tamura et al. |
| 2002/0015475 A1 | 2/2002 | Matsumoto et al. |
| 2002/0016546 A1 | 2/2002 | Cerofolini |
| 2002/0017620 A1 | 2/2002 | Oomori et al. |
| 2002/0018199 A1 | 2/2002 | Blumenfeld et al. |
| 2002/0024016 A1 | 2/2002 | Endo |
| 2002/0027970 A1 | 3/2002 | Chapman et al. |
| 2002/0028994 A1 | 3/2002 | Kamiyama |
| 2002/0031246 A1 | 3/2002 | Kawano |
| 2002/0037068 A1 | 3/2002 | Oikawa |
| 2002/0044691 A1 | 4/2002 | Matsugu |
| 2002/0054694 A1 | 5/2002 | Vachtsevanos et al. |
| 2002/0067259 A1 | 6/2002 | Fufidio et al. |
| 2002/0067793 A1 | 6/2002 | Stierstorfer |
| 2002/0085046 A1 | 7/2002 | Furuta et al. |
| 2002/0088952 A1 | 7/2002 | Rao et al. |
| 2002/0094062 A1 | 7/2002 | Dolazza et al. |
| 2002/0094119 A1 | 7/2002 | Sahadevan |
| 2002/0098518 A1 | 7/2002 | Levinson |
| 2002/0106052 A1 | 8/2002 | Menhardt |
| 2002/0122528 A1 | 9/2002 | Besson |
| 2002/0124664 A1 | 9/2002 | Call et al. |
| 2002/0126800 A1 | 9/2002 | Matsumoto et al. |
| 2002/0127586 A1 | 9/2002 | Mortensen |
| 2002/0141625 A1 | 10/2002 | Nelson |
| 2002/0150200 A1 | 10/2002 | Zonneveld |
| 2002/0161534 A1 | 10/2002 | Adler et al. |
| 2002/0168083 A1 | 11/2002 | Garms et al. |
| 2002/0168657 A1 | 11/2002 | Chen et al. |
| 2002/0172324 A1 | 11/2002 | Ellengogen |
| 2002/0172409 A1 | 11/2002 | Saito et al. |
| 2002/0175921 A1 | 11/2002 | Xu et al. |
| 2002/0176534 A1 | 11/2002 | Meder |
| 2002/0186862 A1* | 12/2002 | McClelland et al. .......... 382/100 |
| 2002/0188197 A1 | 12/2002 | Bishop et al. |
| 2002/0191209 A1 | 12/2002 | Yasumaru |
| 2003/0012420 A1 | 1/2003 | Verwoerd et al. |
| 2003/0023592 A1 | 1/2003 | Modica et al. |
| 2003/0024315 A1 | 2/2003 | Merkel et al. |
| 2003/0031289 A1 | 2/2003 | Hsieh |
| 2003/0031291 A1 | 2/2003 | Yamamoto et al. |
| 2003/0036006 A1 | 2/2003 | Feke et al. |
| 2003/0038945 A1 | 2/2003 | Mahner |
| 2003/0072414 A1 | 4/2003 | Sakaida |
| 2003/0072418 A1 | 4/2003 | Albagli et al. |
| 2003/0072484 A1 | 4/2003 | Kokko et al. |
| 2003/0076924 A1 | 4/2003 | Mario et al. |
| 2003/0081720 A1 | 5/2003 | Swift et al. |
| 2003/0081859 A1* | 5/2003 | Kasutani ....................... 382/305 |
| 2003/0082516 A1 | 5/2003 | Straus |
| 2003/0085348 A1 | 5/2003 | Megerle |
| 2003/0085353 A1 | 5/2003 | Almogy et al. |
| 2003/0091145 A1 | 5/2003 | Mohr et al. |
| 2003/0095633 A1 | 5/2003 | Van Woezik |
| 2003/0095692 A1 | 5/2003 | Mundy et al. |
| 2003/0128812 A1 | 7/2003 | Appleby et al. |
| 2003/0138147 A1 | 7/2003 | Ongkojoyo |
| 2003/0148393 A1 | 8/2003 | Woodbury et al. |
| 2003/0149346 A1 | 8/2003 | Arnone et al. |
| 2003/0165213 A1 | 9/2003 | Maglich |
| 2003/0179853 A1 | 9/2003 | Amemiya et al. |
| 2003/0194121 A1 | 10/2003 | Eberhard et al. |
| 2003/0205676 A1 | 11/2003 | Nelson et al. |
| 2003/0206649 A1 | 11/2003 | Moshe |
| 2003/0210139 A1 | 11/2003 | Brooks et al. |
| 2003/0215051 A1 | 11/2003 | Suzuki |
| 2003/0215143 A1 | 11/2003 | Zakrzewski et al. |
| 2003/0231788 A1 | 12/2003 | Yukhin et al. |
| 2003/0231791 A1 | 12/2003 | Torre-Bueno et al. |
| 2004/0012853 A1 | 1/2004 | Garcia et al. |
| 2004/0013239 A1 | 1/2004 | Gregerson et al. |
| 2004/0016271 A1 | 1/2004 | Shah et al. |
| 2004/0017882 A1 | 1/2004 | Misawa et al. |
| 2004/0017883 A1 | 1/2004 | Takagi et al. |
| 2004/0017888 A1 | 1/2004 | Seppi et al. |
| 2004/0017935 A1 | 1/2004 | Avinash et al. |
| 2004/0022425 A1 | 2/2004 | Avinash et al. |
| 2004/0027127 A1 | 2/2004 | Mills |
| 2004/0037462 A1* | 2/2004 | Lewis et al. ................... 382/181 |
| 2004/0041082 A1 | 3/2004 | Harmon |
| 2004/0051030 A1 | 3/2004 | Olszak et al. |
| 2004/0062342 A1 | 4/2004 | Cahill |

| | | |
|---|---|---|
| 2004/0062349 A1 | 4/2004 | Schuster |
| 2004/0062351 A1 | 4/2004 | Yoshioka |
| 2004/0066882 A1 | 4/2004 | Eberhard et al. |
| 2004/0066884 A1 | 4/2004 | Hermann Claus et al. |
| 2004/0066890 A1 | 4/2004 | Dalmijn et al. |
| 2004/0075058 A1 | 4/2004 | Blevis et al. |
| 2004/0080315 A1 | 4/2004 | Beevor et al. |
| 2004/0082846 A1 | 4/2004 | Johnson et al. |
| 2004/0083958 A1 | 5/2004 | Saidman et al. |
| 2004/0086075 A1 | 5/2004 | Hein et al. |
| 2004/0086160 A1 | 5/2004 | Zimmermann |
| 2004/0087844 A1 | 5/2004 | Yen |
| 2004/0101097 A1* | 5/2004 | Wakayama et al. ............. 378/57 |
| 2004/0102700 A1 | 5/2004 | Asafusa |
| 2004/0109231 A1 | 6/2004 | Haisch et al. |
| 2004/0120009 A1 | 6/2004 | White et al. |
| 2004/0120857 A1 | 6/2004 | Smith et al. |
| 2004/0134986 A1 | 7/2004 | Studer et al. |
| 2004/0141056 A1 | 7/2004 | Izumi et al. |
| 2004/0142386 A1 | 7/2004 | Rigler et al. |
| 2004/0160599 A1 | 8/2004 | Hamamatsu et al. |
| 2004/0161073 A1 | 8/2004 | Nokita |
| 2004/0175041 A1 | 9/2004 | Miller |
| 2004/0176677 A1 | 9/2004 | Hwu et al. |
| 2004/0212492 A1 | 10/2004 | Boesch et al. |
| 2004/0213377 A1 | 10/2004 | Endo |
| 2004/0213600 A1 | 10/2004 | Watanabe et al. |
| 2004/0218729 A1 | 11/2004 | Xue et al. |
| 2004/0225222 A1 | 11/2004 | Zeng et al. |
| 2004/0236520 A1 | 11/2004 | Williams et al. |
| 2004/0240612 A1 | 12/2004 | Suzuki |
| 2004/0247071 A1 | 12/2004 | Dafni |
| 2004/0247171 A1 | 12/2004 | Hashimoto et al. |
| 2004/0252024 A1 | 12/2004 | Huey et al. |
| 2004/0252870 A1 | 12/2004 | Reeves et al. |
| 2004/0253660 A1 | 12/2004 | Gibbs et al. |
| 2004/0258198 A1 | 12/2004 | Carver et al. |
| 2004/0258202 A1 | 12/2004 | Wernick et al. |
| 2004/0263379 A1 | 12/2004 | Keller |
| 2004/0264624 A1 | 12/2004 | Tanaka et al. |
| 2004/0264648 A1 | 12/2004 | Claus et al. |
| 2004/0265175 A1 | 12/2004 | Witty et al. |
| 2005/0008119 A1 | 1/2005 | McClelland et al. |
| 2005/0008203 A1 | 1/2005 | Dixon |
| 2005/0017181 A1 | 1/2005 | Kearfott et al. |
| 2005/0018812 A1 | 1/2005 | Wolfs |
| 2005/0025280 A1 | 2/2005 | Schulte |
| 2005/0025350 A1 | 2/2005 | Engelbart et al. |
| 2005/0025377 A1 | 2/2005 | Avinash et al. |
| 2005/0031069 A1 | 2/2005 | Kaucic et al. |
| 2005/0053307 A1* | 3/2005 | Nose et al. .................... 382/275 |
| 2005/0057354 A1 | 3/2005 | Jenkins et al. |
| 2005/0058242 A1 | 3/2005 | Peschmann |
| 2005/0058350 A1 | 3/2005 | Dugan et al. |
| 2005/0061955 A1 | 3/2005 | Endo |
| 2005/0069085 A1 | 3/2005 | Lewis |
| 2005/0074088 A1 | 4/2005 | Ichihara et al. |
| 2005/0085721 A1 | 4/2005 | Fauver et al. |
| 2005/0094856 A1 | 5/2005 | Warren |
| 2005/0098728 A1 | 5/2005 | Alfano et al. |
| 2005/0105680 A1 | 5/2005 | Nabors et al. |
| 2005/0110672 A1 | 5/2005 | Cardiasmenos et al. |
| 2005/0111618 A1 | 5/2005 | Sommer, Jr. et al. |
| 2005/0113961 A1* | 5/2005 | Sabol et al. ................... 700/182 |
| 2005/0117693 A1 | 6/2005 | Miyano |
| 2005/0117700 A1 | 6/2005 | Peschmann |
| 2005/0123093 A1 | 6/2005 | Lawaczeck et al. |
| 2005/0123174 A1 | 6/2005 | Gorsky et al. |
| 2005/0128069 A1 | 6/2005 | Skatter |
| 2005/0133708 A1 | 6/2005 | Eberhard et al. |
| 2005/0147199 A1 | 7/2005 | Dunham et al. |
| 2005/0153356 A1 | 7/2005 | Okawa et al. |
| 2005/0163354 A1 | 7/2005 | Ziegler |
| 2005/0173284 A1 | 8/2005 | Ambrefe, Jr. |
| 2005/0189412 A1* | 9/2005 | Hudnut et al. ................ 235/383 |
| 2005/0190882 A1 | 9/2005 | McGuire |
| 2005/0206514 A1 | 9/2005 | Zanovitch et al. |
| 2005/0207655 A1 | 9/2005 | Chopra et al. |
| 2005/0212913 A1 | 9/2005 | Richter |
| 2005/0219523 A1 | 10/2005 | Onuma et al. |
| 2005/0220264 A1 | 10/2005 | Homegger |
| 2005/0226375 A1 | 10/2005 | Eberhard et al. |
| 2005/0231421 A1 | 10/2005 | Fleisher et al. |
| 2005/0240858 A1 | 10/2005 | Croft et al. |
| 2005/0248450 A1 | 11/2005 | Zanovitch |
| 2005/0249416 A1 | 11/2005 | Leue et al. |
| 2005/0251397 A1 | 11/2005 | Zanovitch et al. |
| 2005/0251398 A1 | 11/2005 | Zanovitch et al. |
| 2005/0259868 A1 | 11/2005 | Sones |
| 2005/0265517 A1 | 12/2005 | Gary |
| 2005/0271184 A1 | 12/2005 | Ovadia |
| 2005/0275831 A1 | 12/2005 | Silver |
| 2005/0276376 A1 | 12/2005 | Eilbert |
| 2005/0276443 A1 | 12/2005 | Slamani et al. |
| 2005/0279936 A1 | 12/2005 | Litman et al. |
| 2005/0283079 A1 | 12/2005 | Steen et al. |
| 2006/0000911 A1 | 1/2006 | Stekel |
| 2006/0002504 A1 | 1/2006 | De Man et al. |
| 2006/0008054 A1 | 1/2006 | Ohara |
| 2006/0009269 A1 | 1/2006 | Hoskinson et al. |
| 2006/0013455 A1 | 1/2006 | Watson et al. |
| 2006/0013464 A1 | 1/2006 | Ramsay et al. |
| 2006/0017605 A1 | 1/2006 | Lovberg et al. |
| 2006/0018434 A1 | 1/2006 | Jacobs et al. |
| 2006/0018517 A1 | 1/2006 | Chen et al. |
| 2006/0019409 A1 | 1/2006 | Nelson et al. |
| 2006/0034503 A1 | 2/2006 | Shimayama |
| 2006/0036167 A1 | 2/2006 | Shina |
| 2006/0045235 A1 | 3/2006 | Bruder et al. |
| 2006/0045323 A1 | 3/2006 | Ateya |
| 2006/0064246 A1 | 3/2006 | Medberry et al. |
| 2006/0065844 A1 | 3/2006 | Zelakiewicz et al. |
| 2006/0072702 A1 | 4/2006 | Chapman |
| 2006/0083418 A1 | 4/2006 | Watson et al. |
| 2006/0084872 A1 | 4/2006 | Ichikawa et al. |
| 2006/0086794 A1 | 4/2006 | Knowles et al. |
| 2006/0093088 A1 | 5/2006 | Sowerby et al. |
| 2006/0098773 A1 | 5/2006 | Peschmann |
| 2006/0098866 A1 | 5/2006 | Whitson et al. |
| 2006/0115109 A1 | 6/2006 | Whitson et al. |
| 2006/0116566 A1 | 6/2006 | Bruijns |
| 2006/0119837 A1 | 6/2006 | Raguin et al. |
| 2006/0133650 A1 | 6/2006 | Xie et al. |
| 2006/0133659 A1 | 6/2006 | Hammond |
| 2006/0142662 A1 | 6/2006 | Van Beek |
| 2006/0142984 A1 | 6/2006 | Weese et al. |
| 2006/0173268 A1 | 8/2006 | Mullick et al. |
| 2006/0176062 A1 | 8/2006 | Yang et al. |
| 2006/0203960 A1 | 9/2006 | Schlomka et al. |
| 2006/0204080 A1 | 9/2006 | Sones et al. |
| 2006/0215811 A1 | 9/2006 | Modica et al. |
| 2006/0255929 A1 | 11/2006 | Zanovitch et al. |
| 2006/0257005 A1 | 11/2006 | Bergeron et al. |
| 2006/0262902 A1 | 11/2006 | Wattenburg |
| 2006/0269135 A1 | 11/2006 | Ramsay et al. |
| 2006/0273257 A1 | 12/2006 | Roos et al. |
| 2006/0274916 A1 | 12/2006 | Chan et al. |
| 2006/0282886 A1 | 12/2006 | Gaug |
| 2007/0003122 A1 | 1/2007 | Sirohey et al. |
| 2007/0058037 A1 | 3/2007 | Bergeron et al. |
| 2007/0147585 A1* | 6/2007 | Eilbert et al. ................... 378/57 |
| 2007/0168467 A1 | 7/2007 | Hu et al. |
| 2007/0195994 A1 | 8/2007 | McClelland et al. |
| 2007/0200566 A1 | 8/2007 | Clark et al. |
| 2007/0206719 A1 | 9/2007 | Suryanarayanan et al. |
| 2007/0210921 A1 | 9/2007 | Volpi et al. |
| 2007/0269005 A1* | 11/2007 | Chalmers et al. ............... 378/57 |
| 2008/0236275 A1* | 10/2008 | Breed et al. ................. 73/290 V |
| 2008/0260097 A1 | 10/2008 | Anwar et al. |

FOREIGN PATENT DOCUMENTS

| | | |
|---|---|---|
| CA | 2319958 | 9/2000 |
| CA | 2574402 | 1/2006 |
| CA | 2651131 | 11/2007 |
| EP | 0 577 380 A1 | 1/1994 |
| WO | W001/27601 | 4/2001 |
| WO | WO 02/082290 A1 | 10/2002 |
| WO | WO 03/069498 A1 | 8/2003 |

| | | |
|---|---|---|
| WO | WO 03/107113 A3 | 12/2003 |
| WO | WO 2005/086616 A2 | 9/2005 |
| WO | PCT/CA2005/000716 | 2/2006 |
| WO | PCT/CA2005/001930 | 4/2006 |
| WO | PCT/CA/2005001930 | 4/2006 |
| WO | PCT/CA2006/000655 | 8/2006 |
| WO | PCT/CA2006/000751 | 8/2006 |
| WO | WO 2006/119603 A1 | 11/2006 |
| WO | PCT/CA2007/000779 | 8/2007 |
| WO | PCT/CA2007/000840 | 8/2007 |
| WO | PCT/CA2005/000716 | 11/2007 |
| WO | PCT/CA2005/001930 | 11/2007 |
| WO | PCT/CA2006/000655 | 11/2007 |
| WO | PCT/CA2006/000751 | 11/2007 |
| WO | PCT/CA2007/001297 | 11/2007 |
| WO | PCT/CA2007/001298 | 11/2007 |
| WO | PCT/CA2007/001658 | 1/2008 |
| WO | PCT/CA2007/001749 | 1/2008 |

OTHER PUBLICATIONS

Optosecurity, "Security technology overview. Advanced vehicle verification & threat identification", 1 page.

L3 Communications, Security and Detection Systems, "eXaminer 3DX, Explosives Detection System", Nov. 8-9, 2005, 1 page.

International Preliminary Report on Patentability issued on Oct. 6, 2009 in connection with international patent application PCT/CA2008/000275.

Office Action mailed on Feb. 13, 2009 in connection with U.S. Appl. No. 11/268,749.

Office Action mailed on May 28, 2009 in connection with U.S. Appl. No. 11/268,749.

Office Action mailed on Dec. 2, 2008 in connection with Canadian Patent Application 2,546,296.

Office Action mailed on Jun. 29, 2009 in connection with Canadian Patent Application 2,651,131.

H.J. Caufield and W.T. Maloney, Improved discrimination in optical character recognition, 1969, Appl. Opt., 8, p. 2354.

Mahalanobis, A. et al., Minimum average correlation energy filters, Sep. 1, 1987, Appl. Opt. 26 No. 17, pp. 3633-3640.

Joseph L. Horner et al., Phase-only matched filtering, Mar. 15, 1994, Appl. Opt. vol. 23 No. 6, pp. 812-816.

Benjamin R., Object-based 3D X-ray imaging for second-line security screening, 1995, Conf. Publ. No. 408, Londonn, UK: IEE, pp. 310-313, Abstract.

Andre Morin et al., Optical character recognition (OCR) in uncontrolled environnments using optical correlators, 1999, SPIE Int., pp. 346-356.

PinPoint TM Threat Identification Software dated Jul. 25, 2005 of URL: http://www.guardiantechintl.com/security.php?npage=pinpoint, 4 pages.

Gregor McDonald, Fast Pattern Recognition, QinetiQ ltd 2003.

Secure Flight passenger screening program, Oct. 28, 2005, http://www.globalsecurity.org/securiy/systems/passenger_screen.htm, 6 pages.

Security technology overview: Advanced vehicle verification & threat identification, www.optosecurity.com and www.extremeCTV.com, 1 page.

B.V.K. Vijaya Kumar et al., Spatial Frequency Domain Image Processing for Biometric Recognition, 2002, pp. I-53-1-56, vol. 1, IEEE ICIP, Pittsburgh, PA, USA.

eXaminer 3DX, Explosives Detection System, L3 Communications, Security & Detection Systems, Nov. 8-9, 2005.

Airport Magazine, Solutions, Products, Services, vol. 7, Mar. 2006, selected pages.

Restriction Requirement mailed on Nov. 26, 2010 in connection with U.S. Appl. No. 11/694,338, 6 pages.

Search Report mailed on Mar. 24, 2011 in connection with European Patent Application No. 08714598.3—7 pages.

Search Report mailed on Apr. 1, 2011 in connection with European Patent Application No. 06741416.9—7 pages.

Office Action issued on Apr. 19, 2011 in connection with U.S. Appl. No. 11/694,338—10 pages.

Non-Final Office Action issued on Apr. 22, 2011 in connection with U.S. Appl. No. 11/407,217—20 pages.

* cited by examiner

APPARATUS, METHOD AND SYSTEM FOR SCREENING RECEPTACLES AND PERSONS, HAVING IMAGE DISTORTION CORRECTION FUNCTIONALITY

CROSS REFERENCE TO RELATED APPLICATIONS

This application is a continuation-in-part claiming the benefit under 35 USC §120 of PCT international patent application serial number PCT/CA2005/000716, filed on May 11, 2005 and designating the United States, the contents of which are incorporated herein by reference.

This application is also a continuation-in-part claiming the benefit under 35 USC §120 of U.S. patent application Ser. No. 11/268,749 entitled "METHOD AND SYSTEM FOR SCREENING CARGO CONTAINERS", filed on Nov. 8, 2005 now U.S. Pat. No. 7,734,102 by Eric Bergeron et al., the contents of which are incorporated herein by reference.

FIELD OF THE INVENTION

The present invention relates generally to security systems and, more particularly, to methods and systems for screening receptacles including, for example, luggage, mail parcels or cargo containers, to identify certain objects located therein, where such methods and systems implement image distortion correction functionality.

BACKGROUND

Security in airports, train stations, ports, office buildings and other public or private venues is becoming increasingly important particularly in light of recent violent events.

Typically, security screening systems make use of devices generating penetrating radiation, such as x-ray devices, to scan individual pieces of luggage to generate an image conveying the contents of the luggage. The image is displayed on a screen and is examined by a human operator whose task it is to detect and possibly identify, on the basis of the image, potentially threatening objects located in the luggage. In certain cases, some form of object recognition technology may be used to assist the human operator.

A deficiency with current systems is that they are mostly reliant on the human operator to detect and identify potentially threatening objects. However, the performance of the human operator greatly varies according to such factors as poor training and fatigue. As such, the detection and identification of threatening objects is highly susceptible to human error. Furthermore, it will be appreciated that failure to identify a threatening object, such as a weapon for example, may have serious consequences, such as property damage, injuries and fatalities.

Another deficiency with current systems is that the labour costs associated with such systems are significant since human operators must view the images.

Consequently, there is a need in the industry for providing a method and system for use in screening luggage items, cargo containers, mail parcels or persons to identify certain objects that alleviate at least in part the deficiencies of the prior art.

SUMMARY OF THE INVENTION

In accordance with a first broad aspect, the present application seeks to provide an apparatus suitable for screening a receptacle. The apparatus comprises an input for receiving an image signal associated with the receptacle, the image signal conveying an input image related to contents of the receptacle, the image signal having been produced by a device that is characterized by introducing distortion into the input image. The apparatus also comprises a processing unit in communication with the input, and operative for: applying a distortion correction process to the image signal to remove at least part of the distortion from the input image, thereby to generate a corrected image signal conveying at least one corrected image related to the contents of the receptacle; processing the corrected image signal in combination with a plurality of data elements associated with a plurality of target objects in an attempt to detect a presence of at least one of said target objects in the receptacle; and generating a detection signal in response to detection of the presence of at least one of said target objects in the receptacle. The apparatus further comprises an output for releasing the detection signal.

In accordance with a second broad aspect, the present application seeks to provide an apparatus for detecting the presence of one or more prohibited objects in a receptacle. The apparatus comprises an input for receiving an input image conveying graphic information regarding contents of a receptacle, the image having been produced by a device that introduces distortion into the input image; a distortion correction functional unit operable for processing the input image to remove at least part of the distortion from the input image in order to derive at least one corrected image; an optical correlator operable for processing the at least one corrected image in an attempt to detect whether at least one of said one or more prohibited objects is depicted in at least one of the at least one corrected image; and an output for releasing a signal in response to detecting that at least one of said one or more prohibited objects is depicted in at least one of the at least one corrected image.

In accordance with a third broad aspect, the present application seeks to provide a method for screening a receptacle, which comprises receiving an image signal associated with the receptacle, the image signal conveying an input image related to contents of the receptacle, the image signal having been produced by a device that is characterized by introducing distortion into the input image; applying a distortion correction process to the image signal to remove at least part of the distortion from the input image, thereby to generate a corrected image signal conveying at least one corrected image related to the contents of the receptacle; processing the corrected image signal in combination with a plurality of data elements associated with a plurality of target objects in an attempt to detect a presence of at least one of said target objects in the receptacle; generating a detection signal in response to detection of the presence of at least one of said target objects in the receptacle; and releasing the detection signal.

In accordance with a fourth broad aspect, the present application seeks to provide a computer-readable medium comprising computer-readable program code which, when interpreted by a computing apparatus, causes the computing apparatus to execute a method of screening a receptacle. The computer-readable program code comprises first computer-readable program code for causing the computing apparatus to be attentive to receipt of an image signal associated with the receptacle, the image signal conveying an input image related to contents of the receptacle, the image signal having been produced by a device that is characterized by introducing distortion into the input image; second computer-readable program code for causing the computing apparatus to apply a distortion correction process to the image signal to remove at least part of the distortion from the input image, thereby to generate a corrected image signal conveying at least one corrected image related to the contents of the receptacle; third computer-readable program code for causing the computing apparatus to process the corrected image signal in combination with a plurality of data elements associated with a plurality of target objects in an attempt to detect a presence of at least one of said target objects in the receptacle; fourth computer-readable program code for causing the computing apparatus to generate a detection signal in response to detection of the presence of at least one of said target objects in the receptacle; and fifth computer-readable program code for causing the computing apparatus to release the detection signal.

In accordance with a fifth broad aspect, the present application seeks to provide an apparatus for screening a receptacle. The apparatus comprises means for receiving an image signal associated with the receptacle, the image signal conveying an input image related to contents of the receptacle, the image signal having been produced by a device that is characterized by introducing distortion into the input image; means for applying a distortion correction process to the image signal to remove at least part of the distortion from the input image, thereby to generate a corrected image signal conveying at least one corrected image related to the contents of the receptacle; means for processing the corrected image signal in combination with a plurality of data elements associated with a plurality of target objects in an attempt to detect a presence of at least one of said target objects in the receptacle; means for generating a detection signal in response to detection of the presence of at least one of said target objects in the receptacle; and means for releasing the detection signal.

In accordance with a sixth broad aspect, the present application seeks to provide a system for screening a receptacle. The system comprises an image generation device operable to generate an image signal associated with the receptacle, the image signal conveying an input image related to contents of the receptacle, the input image containing distortion introduced by said image generation device. The system also comprises an apparatus in communication with said image generation device, and operable for: applying a distortion correction process to the image signal to remove at least part of the distortion from the input image, thereby to generate a corrected image signal conveying at least one corrected image related to the contents of the receptacle; processing the corrected image signal in combination with a plurality of data elements associated with a plurality of target objects in an attempt to detect a presence of at least one of said target objects in the receptacle; and generating a detection signal in response to detection of the presence of at least one of said target objects in the receptacle. The system further comprises an output module for conveying information derived at least in part on the basis of said detection signal to a user of the system.

For the purpose of this specification, the expression "receptacle" is used to broadly describe an entity adapted for receiving objects therein such as, for example, a luggage item, a cargo container or a mail parcel.

For the purpose of this specification, the expression "luggage item" is used to broadly describe luggage, suitcases, handbags, backpacks, briefcases, boxes, parcels or any other similar type of item suitable for containing objects therein.

For the purpose of this specification, the expression "cargo container" is used to broadly describe an enclosure for storing cargo such as would be used, for example, in a ship, train, truck or an other suitable type of cargo container.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

A detailed description of embodiments of the present invention is provided herein below, by way of example only, with reference to the accompanying drawings, in which.

Figure 1:
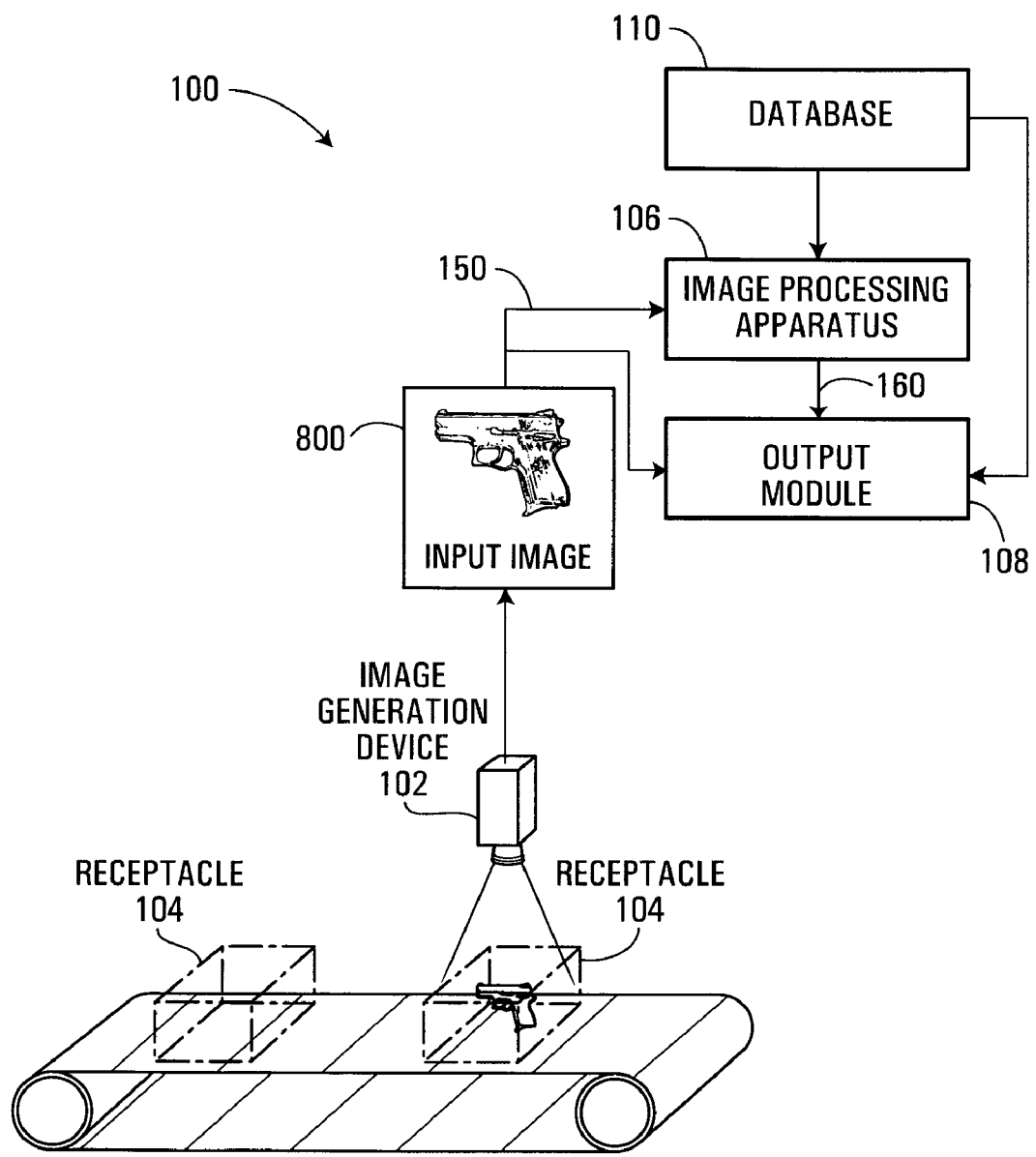
FIG. 1 is a high-level block diagram of a system for screening a receptacle in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

Shown in FIG. 1 is a system 100 for screening a receptacle 104 in accordance with a specific example of implementation of the present invention. The system 100 includes an image generation device 102, an apparatus 106 in communication with the image generation device 102 and an output module 108. The image generation device 102 generates an image signal 150 associated with the receptacle 104. The image signal 150 conveys an input image 800 related to contents of the receptacle 104.

It should be noted that the image generation device 102 may introduce distortion into the input image 800. More specifically, different objects appearing in the input image 800 may be distorted to different degrees, depending on the position of the object in question within the input image 800 and depending on the height of the object in question within the receptacle 104 (which sets the distance between the object in question and the image generation device 102).

The apparatus 106 receives the image signal 150 and processes the image signal 150 in combination with a plurality of data elements associated with a plurality of target objects in an attempt to detect a presence of one or more target objects in the receptacle 104. In a specific non-limiting implementation, the data elements associated with the plurality of target objects are stored in a database 110.

In response to detection of the presence of one or more target objects in the receptacle 104, the apparatus 106 generates a detection signal 160 which conveys the presence of one or more target objects in the receptacle 104. Examples of the manner in which the detection signal 160 can be generated are described later on in the specification. The output module 108 conveys information derived at least in part on the basis of the detection signal 160 to a user of the system.

Advantageously, the system 100 provides assistance to the human security personnel using the system 100 in detecting certain target objects and decreases the susceptibility of the screening process to human error.

In a specific example of implementation, the image generation device 102 uses penetrating radiation or emitted radiation to generate the image signal 150. Specific examples of such devices include, without being limited to, x-ray, gamma ray, computed tomography (CT scans), thermal imaging and millimeter wave devices. Such devices are known in the art and as such will not be described further here. In a non-limiting example of implementation, the image generation device 102 is a conventional x-ray machine and the input image 800 related to the contents of the receptacle 104 is an x-ray image of the receptacle 104 generated by the x-ray machine.

The input image 800 related to the contents of the receptacle 104, which is conveyed by the image signal 150, may be a two-dimensional (2-D) image or a three-dimensional (3-D) image, and may be in any suitable format such as, without limitation, VGA, SVGA, XGA, JPEG, GIF, TIFF and bitmap amongst others. Preferably, the input image 800 related to the contents of the receptacle 104 is in a format that can be displayed on a display screen.

In some embodiments (e.g., where the receptacle 104 is large, as is the case with a cargo container), the image generation device 102 may be configured to scan the receptacle 104 along various axes to generate an image signal conveying multiple input images related to the contents of the receptacle 104. Scanning methods for large objects are known in the art and as such will not be described further here. Each of the multiple images is then processed in accordance with the method described herein below to detect the presence of one or more target objects in the receptacle 104.

In a specific example of implementation, the database 110 includes a plurality of entries associated with respective target objects that the system 100 is designed to detect. A non-limiting example of a target object includes a weapon. The entry in the database 110 that is associated with a particular target object includes a data element associated with the particular target object.

Figure 6:
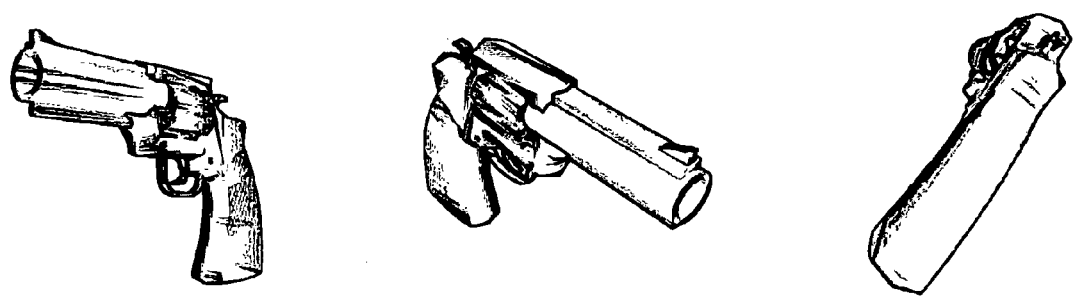
FIG. 6 shows three images associated with a target object suitable for use in connection with the system depicted in FIG. 1, each image depicting the target object in a different orientation, in accordance with a specific example of implementation of the present invention.

In a first non-limiting example of implementation, the data element associated with the particular target object comprises one or more images of the particular target object. The format of the one or more images of the particular target object will depend upon the image processing algorithm implemented by the apparatus 106, to be described later. Where plural images of the particular target object are provided, these images may depict the particular target object in various orientations. FIG. 6 of the drawings depicts an example of arbitrary 3D orientations of a particular target object.

In a second non-limiting example of implementation, the data element associated with the particular target object comprises the Fourier transform of one or more images of the particular target object.

Optionally, for the entry associated with a particular target object, characteristics of the particular target object are provided. Such characteristics may include, without being limited to, the name of the particular target object, its associated threat level, the recommended handling procedure when the particular target object is detected and any other suitable information. Optionally still, the entry associated with a particular target object is also associated with a respective target object identifier data element.

Although the database 110 has been shown in FIG. 1 to be a component separate from the apparatus 106, it will be appreciated that in certain embodiments the database 110 may be part of apparatus 106 and that such implementations do not detract from the spirit of the invention. In addition, it will also be appreciated that in certain implementations, the database 110 is shared between multiple apparatuses 106.

Figure 2:
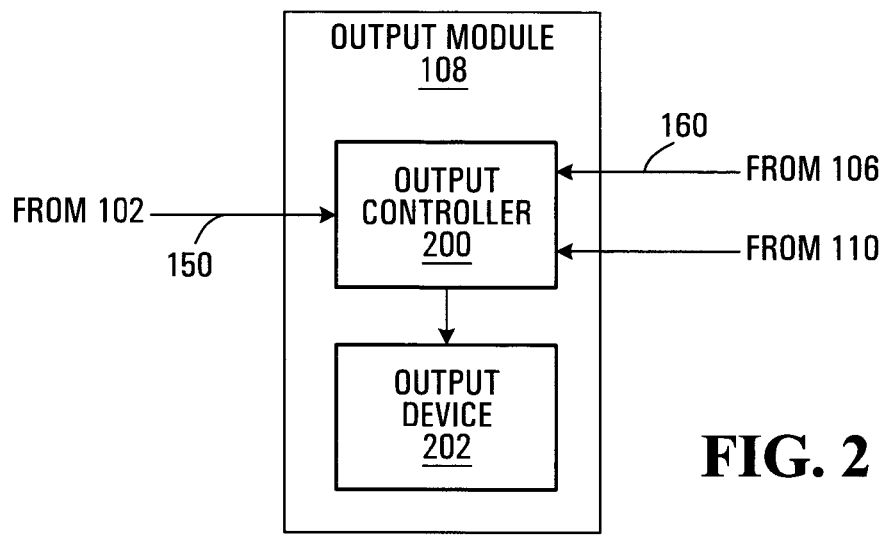
FIG. 2 is a block diagram of an output module suitable for use in connection with the system depicted in FIG. 1 in accordance with a specific example of implementation of the present invention.

In a specific example of implementation, the output module 108 conveys to a user of the system information derived at least in part on the basis of the detection signal 160. A specific example of implementation of the output module 108 is shown in FIG. 2. As depicted, the output module includes an output device 202 and an output controller unit 200.

The output controller unit 200 receives from the apparatus 106 (shown in FIG. 1) the detection signal 160 conveying the presence of one or more target objects (hereinafter referred to as "detected target objects") in the receptacle 104. In a specific implementation, the detection signal 160 conveys information regarding the position and/or orientation of the one or more target detected objects within the receptacle 104. Optionally, the detection signal 160 also conveys one or more target object identifier data elements, which permit identification of the one or more detected target objects. The one or more target object identifier data elements are associated with corresponding entries in the database 110.

In a first specific example of implementation, the output controller unit 200 is adapted to cause a display unit to convey information related to the one or more detected target objects. In a non-limiting example of implementation, the output controller unit 200 generates image data conveying the location of the one or more detected target objects within the receptacle 104. Optionally, the output controller unit 200 also extracts characteristics of the one or more detected target objects from the database 110 on the basis of the target object identifier data element and generates image data conveying the characteristics of the one or more detected target objects. In yet another non-limiting example of implementation, the output controller unit 200 generates image data conveying the location of the one or more detected target objects within the receptacle 104 in combination with the input image generated by the image generation device 102 (shown in FIG. 1).

In a second specific example of implementation, the output controller unit 200 is adapted to cause an audio unit to convey information related to the one or more detected target objects. In a specific non-limiting example of implementation, the output controller unit 200 generates audio data conveying the presence of the one or more detected target objects, the location of the one or more detected target objects within the receptacle 104 and the characteristics of the one or more detected target objects.

The output controller unit 200 then releases a signal for causing the output device 202 to convey the desired information to a user of the system.

The output device 202 may be any device suitable for conveying information to a user of the system 100 regarding the presence of one or more target objects in the receptacle 104. The information may be conveyed in visual format, audio format or as a combination of visual and audio formats.

Figure 4A:
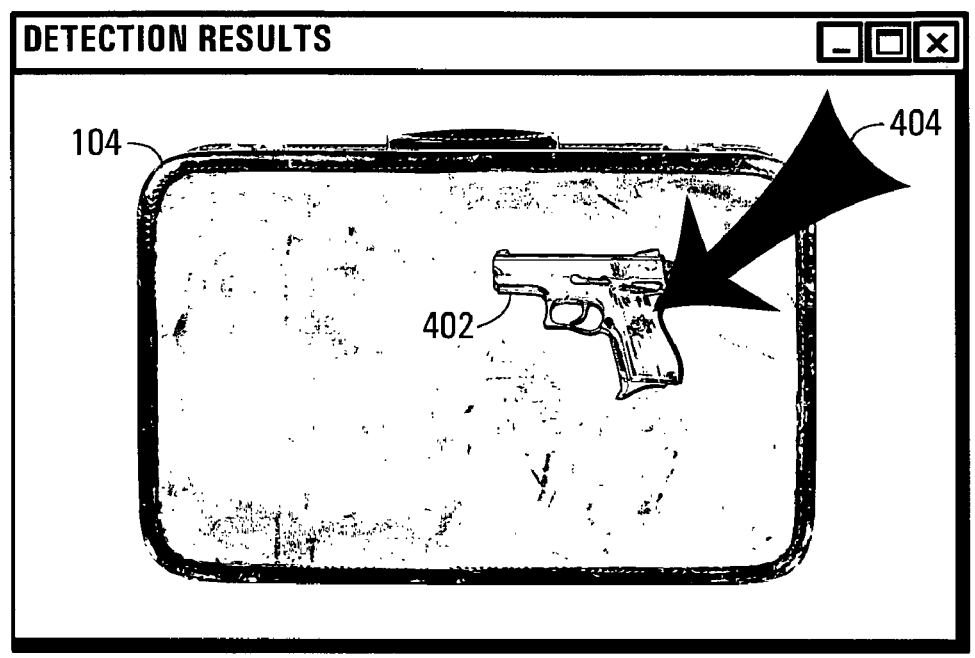
FIGS. 4a and 4b depict specific examples of visual outputs conveying the presence of at least one target object in the receptacle in accordance with specific examples of implementation of the present invention.
Figure 4B:
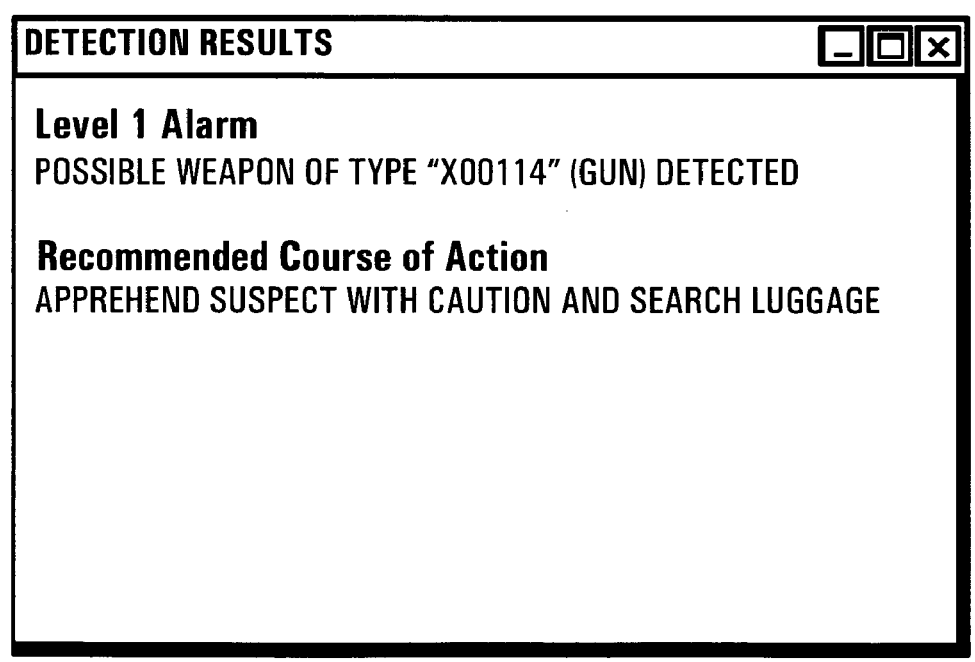

In a first specific example of implementation, the output device 202 includes a display screen adapted for displaying in visual format information related to the presence of the one or more detected target objects. In a second specific example of implementation, the output device 202 includes a printer adapted for displaying in printed format information related to the presence of the one or more detected target objects. FIGS. 4a and 4b show in simplified form examples of information in visual format related to the presence of the one or more detected target objects. More specifically, in FIG. 4a, the input image generated by the image generation device 102 is displayed along with a visual indicator (e.g., arrow 404) identifying the location of a specific detected target object (e.g., gun 402) detected by the apparatus 106. Alternatively, in FIG. 4b, a text message is provided describing a specific detected target object. It will be appreciated that the output device 202 may produce additional information without detracting from the spirit of the invention and that the examples illustrated in FIGS. 4a and 4b have been provided for the purpose of illustration only.

In a third specific example of implementation, the output device 202 includes an audio output unit adapted for releasing an audio signal conveying information related to the presence of one or more target objects in the receptacle 104.

In a fourth specific example of implementation, the output device 202 includes a set of visual elements, such as lights or other suitable visual elements, adapted for conveying in visual format information related to the presence of one or more target objects in the receptacle 104.

The person skilled in the art will readily appreciate, in light of the present specification, that other suitable types of output devices may be used without detracting from the spirit of the invention.

Figure 3:
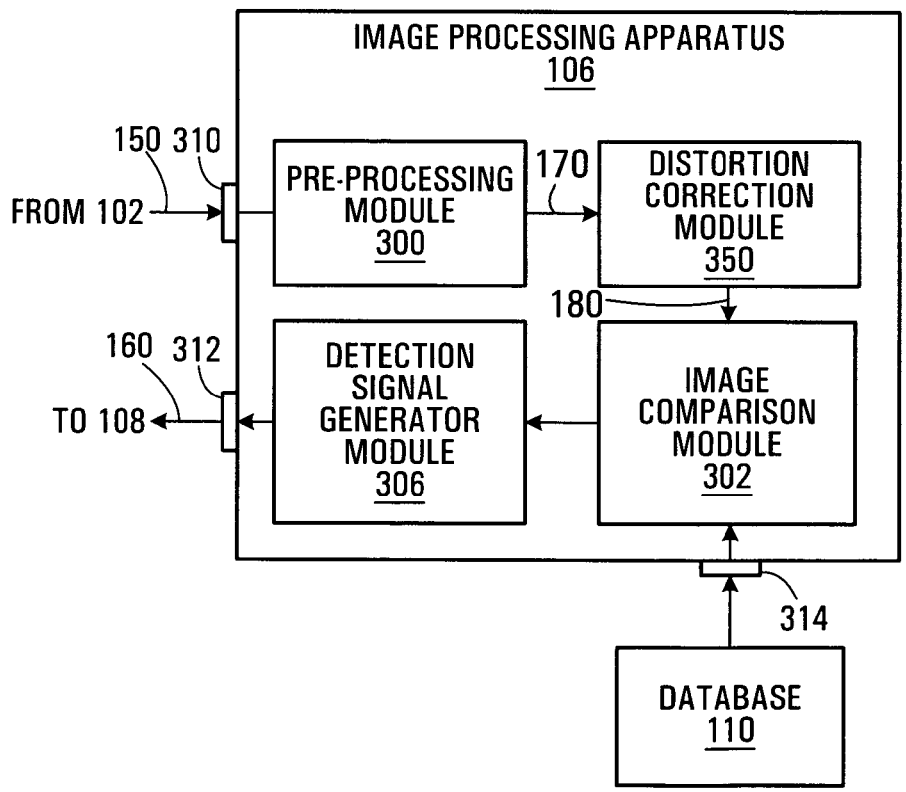
FIG. 3 is a block diagram of an apparatus for processing images suitable for use in connection with the system depicted in FIG. 1 in accordance with a specific example of implementation of the present invention.

The apparatus 106 will now be described in greater detail with reference to FIG. 3. As depicted, the apparatus 106 includes a first input 310, a second input 314, an output 312 and a processing unit. The processing unit comprises a plurality of functional elements such as a pre-processing module 300, a distortion correction module 350, an image comparison module 302 and a detection signal generator module 306.

The first input 310 is for receiving an image signal 150 associated with the receptacle 104 from the image generation device 102 (shown in FIG. 1). It is recalled that the image signal 150 conveys the input image 800 related to the contents of the receptacle 104. The second input 314 is for receiving data elements from the database 110, such data elements being associated with target objects. It will be appreciated that in embodiments where the database 110 is part of apparatus 106, the second input 314 may be omitted. The output 312 is for releasing the detection signal 160 conveying the presence of one or more target objects in the receptacle 104. The detection signal 160 is transmitted towards the output module 108.

Generally speaking, the processing unit of the apparatus 106 receives the image signal 150 associated with the receptacle 104 from the first input 310 and processes the image signal 150 in combination with the data elements associated with target objects (received from the database 110 at the second input 314) in an attempt to detect the presence of one or more target objects in the receptacle 104. In response to detection of one or more target objects (hereinafter referred to as "detected target objects") in the receptacle 104, the processing unit of the apparatus 106 generates and releases at the output 312 the detection signal 160 which conveys the presence of the one or more detected target objects in the receptacle 104.

Figure 5:
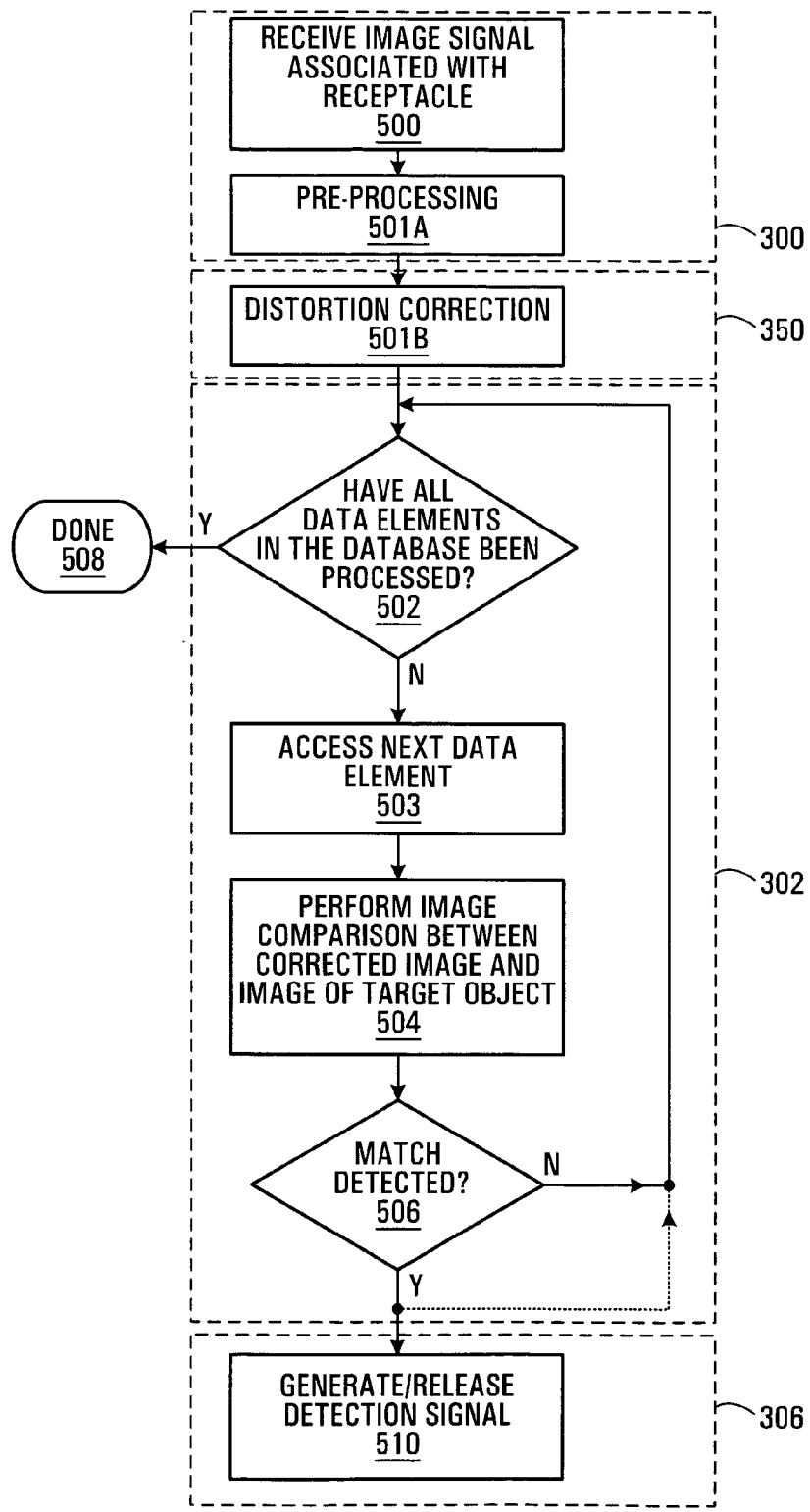
FIG. 5 is a flow diagram depicting a process for detecting a presence of at least one target object in the receptacle in accordance with specific examples of implementation of the present invention.

The various functional elements of the processing unit of the apparatus 106 implement a process, which is depicted in FIG. 5.

Step 500

At step 500, the pre-processing module 300 receives the image signal 150 associated with the receptacle 104 via the first input 310. It is recalled that the image signal 150 conveys an input image 800 related to the contents of the receptacle 104.

Step 501A

At step 501A, the pre-processing module 300 processes the image signal 150 in order to enhance the input image 800 related to the contents of the receptacle 104, remove extraneous information therefrom and remove noise artefacts, thereby to help obtain more accurate comparison results later on. The complexity of the requisite level of pre-processing and the related trade-offs between speed and accuracy depend on the application. Examples of pre-processing may include, without being limited to, brightness and contrast manipulation, histogram modification, noise removal and filtering amongst others. As part of step 501A, the pre-processing module 300 releases a modified image signal 170 for processing by the distortion correction module 350 at step 501B. The modified image signal 170 conveys a pre-processed version of the input image 800 related to the contents of the receptacle 104.

Step 501B

One recalls at this point that the image generation device 102 may have introduced distortion into the input image 800 related to the contents of the receptacle 104. At step 501B, the distortion correction module 350 processes the modified image signal 170 in order to remove distortion from the pre-processed version of the input image 800. The complexity of the requisite amount of distortion correction and the related trade-offs between speed and accuracy depend on the application. As part of step 501B, the distortion correction module 350 releases a corrected image signal 180 for processing by the image comparison module 302 at step 502. The corrected image signal 180 conveys at least one corrected image related to the contents of the receptacle 104.

Figure 13:
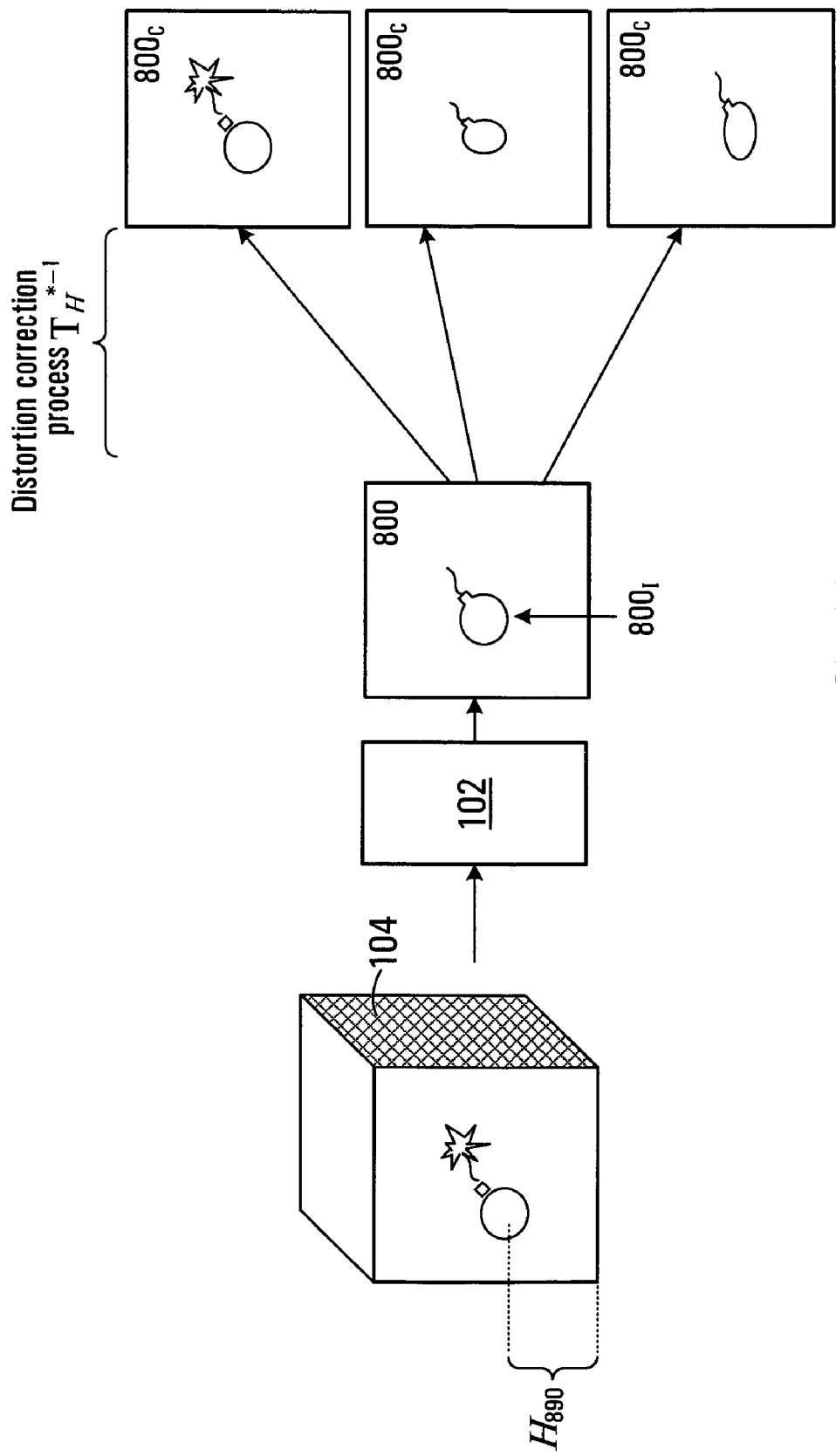
FIG. 13 diagrammatically illustrates the effect of distortion correction applied by the apparatus for processing images.

With reference now to FIG. 13, distortion correction may be performed by applying a distortion correction process, which is referred to as $T_H^{*-1}$ for reasons that will become apparent later on. Ignoring for simplicity the effect of the pre-processing module 300, let the input image 800 be defined by intensity data for a set of observed coordinates, and let each of a set of one or more corrected images $800_C$ be defined by modified intensity data for a set of new coordinates. Applying the distortion correction process $T_H^{*-1}$ may thus consist of transforming the input image 800 (i.e., the intensity data for the set of observed coordinates) in order to arrive at the modified intensity data for the new coordinates in each of the corrected images $800_C$.

Assuming that the receptacle 104 were flat (in the Z-direction), one could model the distortion introduced by the image generation device 102 as a spatial transformation T on a "true" image to arrive at the input image 800. Thus, T would represent a spatial transformation that models the distortion affecting a target object having a given shape and location in the "true" image, resulting in that object's "distorted" shape and location in the input image 800. Thus, to obtain the object's "true" shape and location, it is reasonable to want to make the distortion correction process resemble the inverse of T as closely as possible, so as to facilitate accurate identification of a target object in the input image 800. However, not only is T generally unknown in advance, but moreover it will actually be different for objects appearing at different heights within the receptacle 104.

More specifically, different objects appearing in the input image 800 may be distorted to different degrees, depending on the position of those objects within the input image 800 and depending on the height of those objects within the receptacle 104 (i.e., the distance between the object in question and the image generation device 102). Stated differently, assume that a particular lo target object 890 is located at a given height $H_{890}$ within the receptacle 104. An image taken of the particular target object 890 will manifest itself as a corresponding image element $800_I$ in the input image 800, containing a distorted version of the particular target object 890. To account for the distortion of the shape and location of the image element $800_I$ within the input image 800, one can still use the spatial transformation approach mentioned above, but this approach needs take into consideration the height $H_{890}$ at which the particular target object 890 appears within the receptacle 104. Thus, one can denote the spatial transformation for a given candidate height H by $T_H$, which therefore models the distortion affects the "true" images of target objects when such target objects are located at the candidate height H within the receptacle 104.

Now, although $T_H$ is not known, it may be inferred, from which its inverse can be obtained. The inferred version of $T_H$ is denoted $T_H^*$ and is hereinafter referred to as an "inferred spatial transformation" for a given candidate height H. Basically, $T_H^*$ can be defined as a data structure that represents an estimate of $T_H$. Although the number of possible heights that a target object may occupy is a continuous variable, it may be possible to granularize this number to a limited set of "candidate heights" (e.g., such as 5-10) without introducing a significant detection error. Of course, the number of candidate heights in a given embodiment may be as low as one, while the upper bound on the number of candidate heights is not particularly limited.

The data structure that represents the inferred spatial transformation $T_H^*$ for a given candidate height H may be characterized by a set of parameters derived from the coordinates of a set of "control points" in both the input image 800 and an "original" image for that candidate height. An "original" image for a given candidate height would contain non-distorted images of objects only if those images appeared within the receptacle 104 at the given candidate height. Of course, while the original image for a given candidate height is unknown, it may be possible to identify picture elements in the input image portion that are known to have originated from specific picture elements in the (unknown) original image. Thus, a "control point" corresponds to a picture element that occurs at a known location in the original image for a given candidate height H, and whose "distorted" position can be located in the input image 800.

Figure 14:
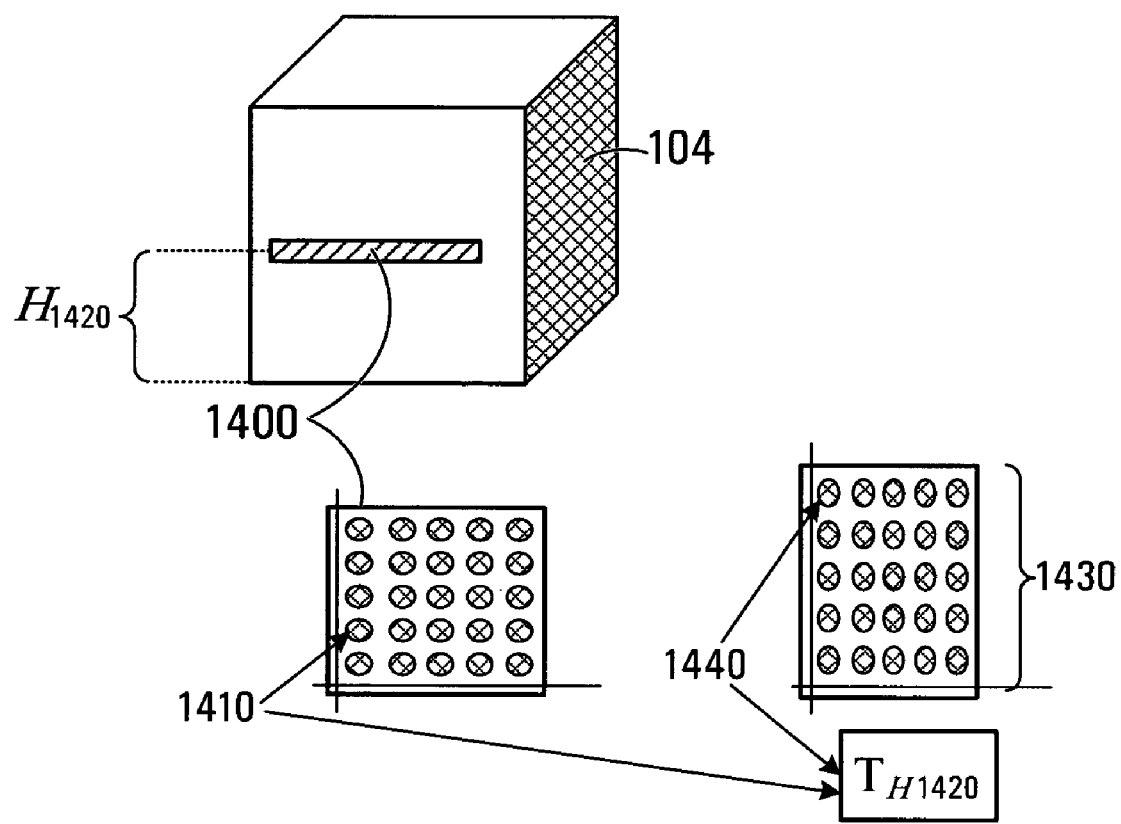
FIG. 14 diagrammatically illustrates a template for use in a registration process in order to model distortion introduced by the image generation device.

In one specific non-limiting embodiment, to obtain control points specific to a given image generation device 102, and with reference to FIG. 14, one can use a template 1400 having a set of spaced apart holes 1410 at known locations in the horizontal and vertical directions. The template is placed at a given candidate height $H_{1420}$. One then acquires an input image 1430, from which control points 1440 (i.e., the holes 1410 present at known locations in the template) are identified in the input image 1430. This may also be referred to as "a registration process". Having performed the registration process on the input image 1430 that was derived from the template 1400, one obtains $T_{H1420}^*$, the inferred spatial transformation for the height $H_{1420}$.

To obtain the inferred spatial transformation $T_H^*$ for a given candidate height H, one may utilize a "transformation model". The transformation model that is used may fall into one or more of the following non-limiting categories, depending on the type of distortion that is sought to be corrected:

linear conformal;
affine;
projective
polynomial warping (first order, second order, etc.);
piecewise linear;
local weighted mean;
etc.

The use of the function cp2tform in the Image Processing Toolbox of Matlab® (available from Mathworks Inc.) is particularly suitable for the computation of inferred spatial transformations such as $T_H^*$ based on coordinates for a set of control points. Other techniques will now be apparent to persons skilled in the art to which the present invention pertains.

The above process can be repeated several times, for different candidate heights, thus obtaining $T_H^*$ for various candidate heights. It is noted that the derivation of $T_H^*$ for various candidate heights can be performed off-line, i.e., before scanning of the receptacle 104. In fact, the derivation of $T_H^*$ is independent of the contents of the receptacle 104.

Returning now to FIG. 13, and assuming that $T_H^*$ for a given set of candidate heights has been obtained (e.g., retrieved from memory), one inverts these transformations and applies the inverted transformations (denoted $T_H^{*-1}$) to the input image 800 in order to obtain the corrected images $800_C$. This completes the distortion correction process.

It is noted that inverting $T_H^*$ for the various candidate heights yields a corresponding number of corrected images $800_C$. Those skilled in the art will appreciate that each of the corrected images $800_C$ will contain areas of reduced distortion where those areas contained objects located at the candidate height for which the particular corrected image $800_C$ was generated.

It will be appreciated that $T_H^{*-1}$ is not always computable in closed form based on the corresponding $T_H^*$. Nevertheless, the corrected image $800_C$ for the given candidate height can be obtained from the input image 800 using interpolation methods, based on the corresponding $T_H^*$. Examples of suitable interpolation methods that may be used include bicubic, bilinear and nearest-neighbor, to name a few.

The use of the function imtransform in the Image Processing Toolbox of Matlab® (available from Mathworks Inc.) is particularly suitable for the computation of an output image (such as one of the corrected images $800_C$) based on an input image (such as the input image 800) and an inferred spatial transformation such as $T_H^*$. Other techniques will now be apparent to persons skilled in the art to which the present invention pertains.

It is noted that certain portions of the corrected image $800_C$ for a given candidate height might not exhibit less distortion than in the input image 800, for the simple reason that the objects contained in those portions appeared at a different height within the receptacle 104 when they were being scanned. Nevertheless, if a certain target object was in the receptacle 104, then it is likely that at least one portion of the corrected image $800_C$ for at least one candidate height will show a reduction in distortion with respect to representation of the certain target object in the input image 800, thus facilitating comparison with data elements in the database 110 as described later on.

Naturally, the precise numerical values in the transformations used in the selected distortion correction technique may vary from one image generation device 102 to the next, as different image generation devices introduce different amounts of distortion of different types, which appear in different regions of the input image 800.

Of course, those skilled in the art will appreciate that similar reasoning and calculations apply when taking into account the effect of the pre-processing module 300, the only difference being that one would be dealing with observations made in the pre-processed version of the input image 800 rather than in the input image 800 itself.

It will also be appreciated that the functionality of the pre-processing module 300 and the distortion correction module 350 can be performed in reverse order. In other embodiments, all or part of the functionality of the pre-processing module 300 and/or the distortion correction module 350 may be external to the apparatus 106, e.g., such functionality may be integrated with the image generation device 102 or performed by external components. It will also be appreciated that the pre-processing module 300 and/or the distortion correction module 350 (and hence steps 501A and/or 501B) may be omitted in certain embodiments of the present invention without detracting from the spirit of the invention.

Step 502

At step 502, the image comparison module 302 verifies whether there remain any unprocessed data elements in the database 110. In the affirmative, the image comparison module 302 proceeds to step 503 where the next one of the data elements is accessed and the image comparison module 302 then proceeds to step 504. If at step 502 all data elements in the database 110 have been processed, the image comparison module 302 proceeds to step 508 and the process is completed.

Step 504

Assuming for the moment that the data elements in the database 110 represent images of target objects, the data element accessed at step 503 conveys a particular image of a particular target object. Thus, at step 504, the image comparison module 302 effects a comparison between at least one corrected image related to the contents of the receptacle 104 (which are conveyed in the corrected image signal 180) and the particular image of the particular target object to determine whether a match exists. It is noted that more than one corrected image may be provided, namely when more than one candidate height is accounted for. The comparison may be effected using any image processing algorithm suitable for comparing two images. Examples of algorithms that can be used to perform image processing and comparison include without being limited to:

- A—ENHANCEMENT: Brightness and contrast manipulation; Histogram modification; Noise removal; Filtering.
- B—SEGMENTATION: Thresholding; Binary or multi-level; Hysteresis based; Statistics/histogram analysis; Clustering; Region growing; Splitting and merging; Texture analysis; Watershed; Blob labeling;
- C—GENERAL DETECTION: Template matching; Matched filtering; Image registration; Image correlation; Hough transform;
- D—EDGE DETECTION: Gradient; Laplacian;
- E—MORPHOLOGICAL IMAGE PROCESSING: Binary; Grayscale;
- F—FREQUENCY ANALYSIS: Fourier Transform; Wavelets;
- G—SHAPE ANALYSIS AND REPRESENTATIONS: Geometric attributes (e.g. perimeter, area, euler number, compactness); Spatial moments (invariance); Fourier descriptors; B-splines; Chain codes; Polygons; Quad tree decomposition;
- H—FEATURE REPRESENTATION AND CLASSIFICATION: Bayesian classifier; Principal component analysis; Binary tree; Graphs; Neural networks; Genetic algorithms; Markov random fields.

The above algorithms are well known in the field of image processing and as such will not be described further here.

In a specific example of implementation, the image comparison module 302 includes an edge detector to perform part of the comparison at step 504.

In another specific example of implementation, the comparison performed at step 504 includes effecting a "correlation operation" between the at least one corrected image related to the contents of the receptacle 104 (which are conveyed in the corrected image signal 180) and the particular image of the particular target object. Again, it is recalled that when multiple candidate heights are accounted for, then multiple corrected images may need to be processed, either serially, in parallel or a combination thereof.

In a specific non-limiting embodiment, the correlation operation involves computing the Fourier transform of the at least one corrected image related to the contents of the receptacle 104 (which are conveyed in the corrected image signal 180), computing the Fourier transform complex conjugate of the particular image of the particular target object, multiplying the two Fourier transforms together and then taking the Fourier transform (or inverse Fourier transform) of the product. Simply put, the result of the correlation operation provides a measure of the degree of similarity between the two images.

In a specific example of implementation, the correlation operation is performed by an optical correlator. A specific example of implementation of an optical correlator suitable for use in comparing two images will be described later on in the specification. In an alternative example of implementation, the correlation operation is performed by a digital correlator.

The image comparison module 302 then proceeds to step 506.

Step 506

The result of the comparison effected at step 504 is processed to determine whether a match exists between (I) at least one of the at least one corrected image $800_C$ related to the contents of the receptacle 104 and (II) the particular image of the particular target object. In the absence of a match, the image comparison module 302 returns to step 502. However, in response to detection of a match, it is concluded that the particular target object has been detected in the receptacle and the image comparison module 302 triggers the detection signal generation module 306 to execute step 510. Then, the image comparison module 302 returns to step 502 to continue processing with respect to the next data element in the database 100.

Step 510

At step 510, the detection signal generation module 306 generates the aforesaid detection signal 160 conveying the presence of the particular target object in the receptacle 104. The detection signal 160 is released via the output 312. The detection signal 160 may simply convey the fact that the particular target object has been detected as present in the receptacle 104, without necessarily specifying the identity of the particular target object. Alternatively, the detection signal 160 may convey the actual identity of the particular target object. As previously indicated, the detection signal 160 may include information related to the positioning of the particular target object within the receptacle 104 and optionally a target object identifier data element associated with the particular target object.

It should be noted that generation of the detection signal 160 may also be deferred until multiple or even all of the data elements in the database 110 have been processed. Accordingly, the detection signal may convey the detection of multiple particular target objects in the receptacle 104 and/or their respective identities.

It will be appreciated that the correlation operation may be implemented using a digital correlator. The correlation operation is computationally intensive and, in certain implementations requiring real-time performance, the use of a digital correlator may not provide suitable performance. Under such conditions, an optical correlator may be preferred.

Figure 8A:
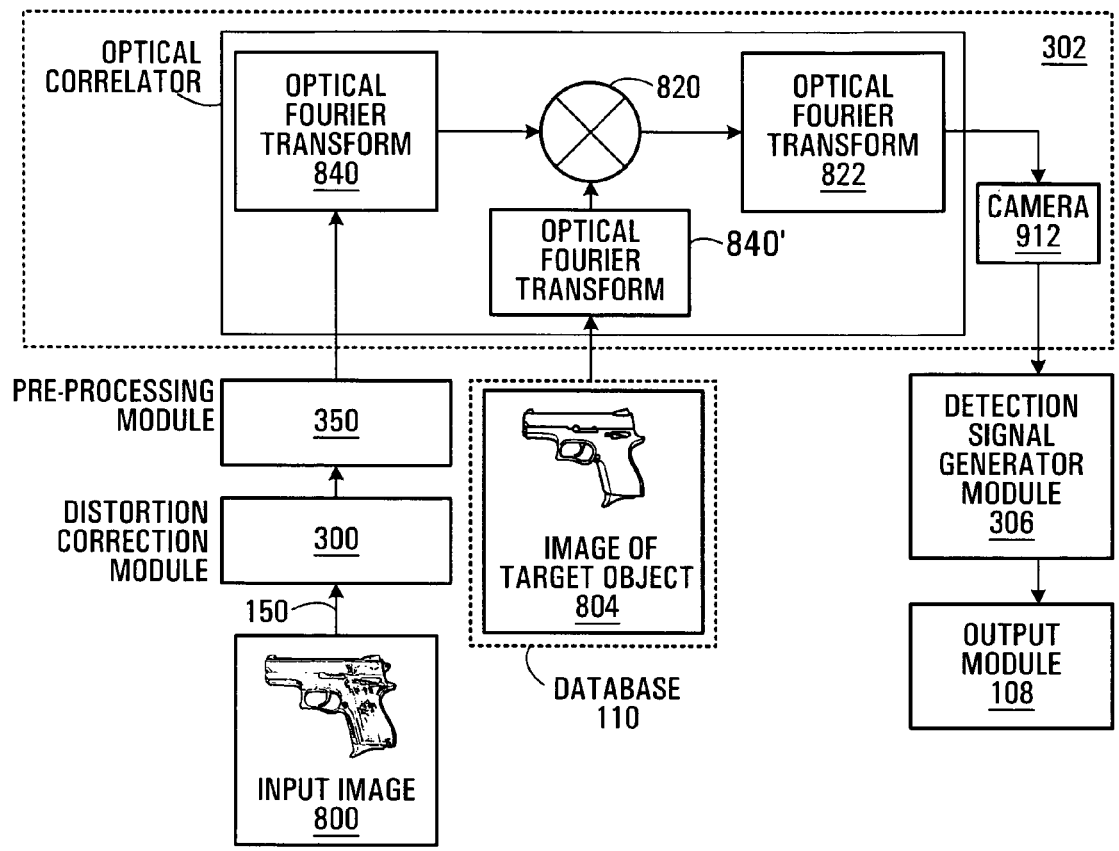
FIG. 8A is a functional block diagram of a receptacle screening system including an optical correlator in accordance with a specific example of implementation of the present invention.
Figure 8B:
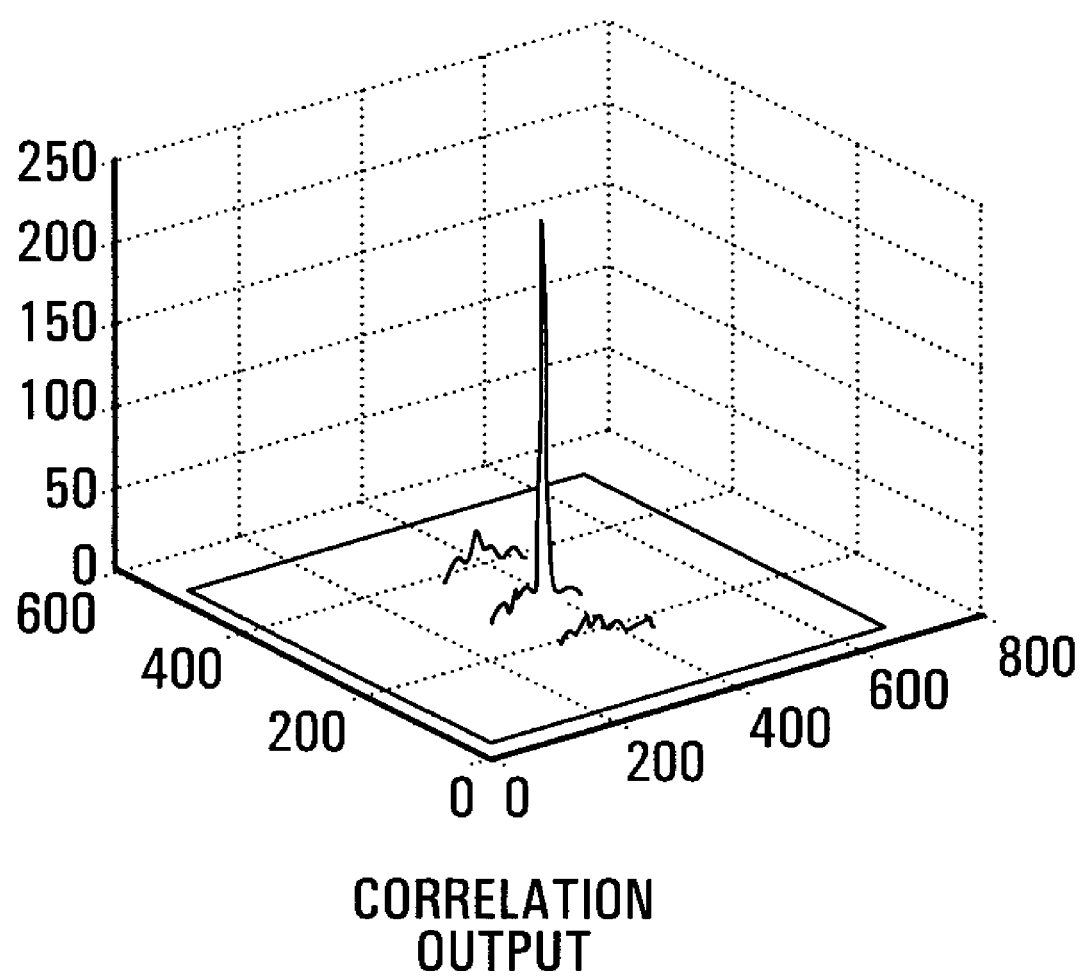
FIG. 8B shows a peak observed in an output of the optical correlator of FIG. 8A.
Figure 8C:
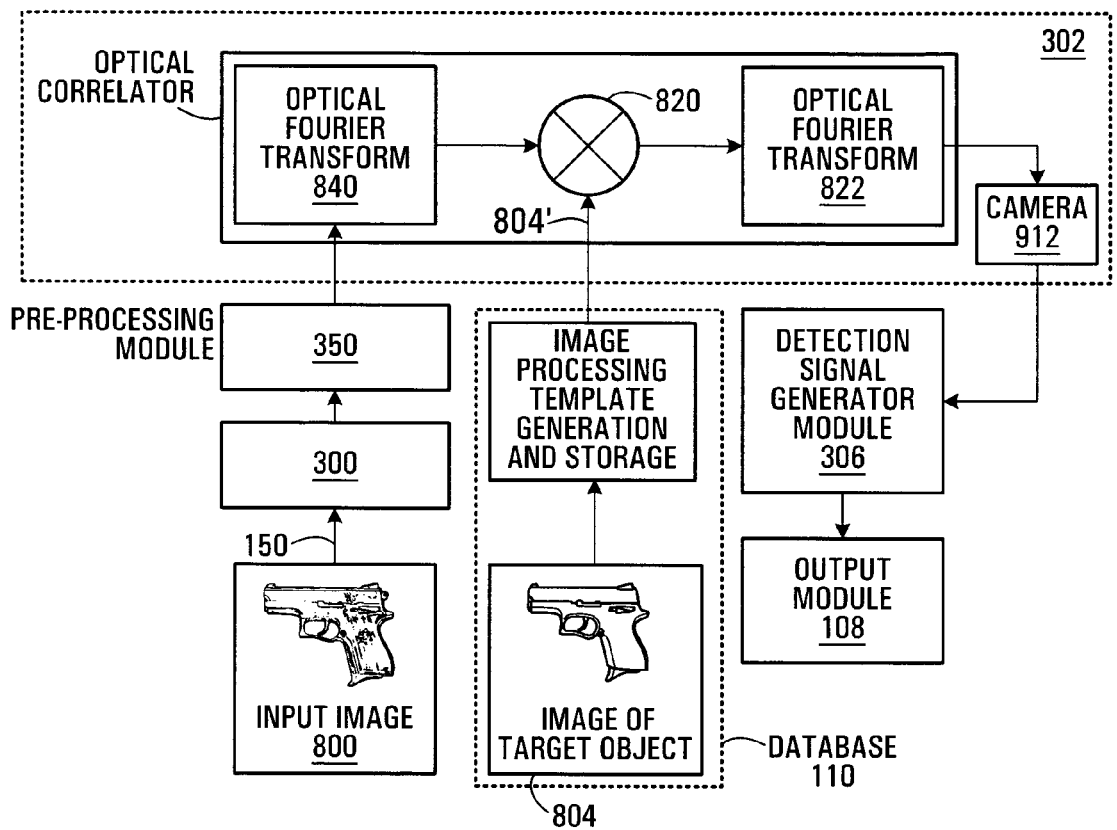
FIG. 8C is a functional block diagram of a receptacle screening system including an optical correlator in accordance with another specific example of implementation of the present invention.

Advantageously, an optical correlator performs the correlation operation physically through light-based computation, rather than by using software running on a silicon-based computer, which allows computations to be performed at a higher speed than is possible with a software implementation and thus provides for improved real-time performance. Specific examples of implementation of the optical correlator include a joint transform correlator (JTC) and a focal plane correlator (FPC). Two specific non-limiting embodiments of a suitable optical correlator are shown in FIGS. 8A and 8C.

In a first embodiment, now described with reference to FIG. 8A, the optical correlator effects a Fourier transformation 840 of a given corrected image related to the contents of the receptacle 104. Also, the optical correlator effects a complex conjugate Fourier transformation 840' of a particular image 804 of a particular target object obtained from the database 110. Image processing and enhancement, as well as distortion pre-emphasis, can also be performed on the particular image 804 to obtain better matching performance depending on the environment and application. The result of the two Fourier transformations is multiplied 820. The optical correlator then processes the result of the multiplication of the two Fourier transforms by applying another optical Fourier transform (or inverse Fourier transform) 822. The resulting signal is captured by a camera (or charge coupled device) 912 at what is referred to as the correlation plane, which yields the correlation output, shown at FIG. 8B. The correlation output is released for transmission to the detection signal generator 306 where it is analyzed. A peak in the correlation output (see FIG. 8B) indicates a match between the input image 800 related to the contents of the receptacle 104 and the particular image 804 of the particular target object. The result of the processing is then conveyed to the user by output module 108.

In a second embodiment, now described with reference to FIG. 8C, the data elements in the database 110 include data indicative of the Fourier transform of the images of the target objects that the system 100 is designed to detect. Such data elements will be referred to herein after as "templates" (or "filters") for particular target objects. In non-limiting examples of implementation, the templates (or filters) are digitally pre-computed such as to improve the speed of the correlation operation when the system 100 is in use. Image processing and enhancement, as well as distortion pre-emphasis, can also be performed on the image of a particular target object to obtain better matching performance depending on the environment and application.

In this second embodiment, the data element accessed at step 503 conveys a particular template (or filter) 804' for a particular image 804. Thus, in a modified version of step 504, and with continued reference to FIG. 8C, the image comparison module 302 implements an optical correlator for effecting a Fourier transformation 840 of a given corrected image related to the contents of the receptacle 104. The result is multiplied 820 with the (previously computed) template (or filter) 804' for the particular image 804, as accessed from the database 110. The optical correlator then processes the product by applying the optical Fourier transform (or inverse Fourier transform) 822. The resulting signal is captured by the camera 912 at the correlation plane, which yields the correlation output, shown at FIG. 8B. The correlation output is released for transmission to the detection signal generator 306 where it is analyzed. A peak in the correlation output (see FIG. 8B) indicates a match between the input image 800 related to the contents of the receptacle 104 and the template (or filter) 804' for the particular image 804. The result of the processing is then conveyed to the user by output module 108.

The content and format of the database 110 may be further varied from one implementation to the next, and the skilled person in the art will readily appreciate in light of the present description that other approaches to generating templates (or filters) may be used without detracting from the spirit of the invention.

Many methods for generating filters are known in the art and a few such methods will be described later on in the specification. The reader is invited to refer to the following document for additional information regarding phase only filters (POF): *Phase-Only Matched Filtering*, Joseph L. Homer and Peter D. Gianino, Appl. Opt. Vol. 23 no. 6, 15 Mar. 1994, pp. 812-816. The contents of this document are incorporated herein by reference.

In a non-limiting example of implementation, the generation of the template (or filter) is performed in a few steps. First, the background is removed from the particular image of the particular target object. In other words, the particular image is extracted from the background and the background is replaced by a black background. The resulting image is then processed through a Fourier transform function. The result of this transform is a complex image. A phase only filter (POF) for example will only contain the complex conjugate of the phase information (between zero and 2 pi) which is mapped to a 0 to 255 range values. These 256 values correspond in fact to the 256 levels of gray of an image.

As a variant, in order to reduce the amount of data needed to represent the whole range of 3D orientations that a single target object can take, a MACE (Minimum Average Correlation Energy) filter is used to generate a template (or filter) for a given target object. Typically, the MACE filter combines several different 2D projections of a given object and encodes them in a single MACE filter instead of having one 2D projection per filter. One of the benefits of using MACE filters is that the resulting database 110 would take less space since it would include fewer items. Also, since the number of correlation operations needed to identify a single target object would be reduced, the total processing time to determine whether a given object is present would also be reduced. The reader is invited to refer to the following document for additional information regarding MACE filters: Mahalanobis, A., B. V. K. Vijaya Kumar, and D. Casasent (1987); *Minimum Average Correlation Energy Filters*, Appl. Opt. 26 no. 17, 3633-3640. The contents of this document are incorporated herein by reference.

Figure 7:
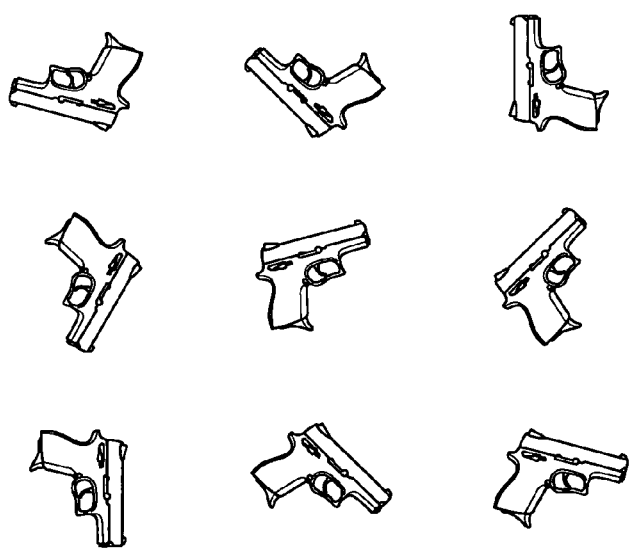
FIG. 7 shows a mosaic image including a plurality of sub-images associated with a target object suitable for use in connection with the system depicted in FIG. 1, each sub-image depicting the target object in a different orientation and scale, in accordance with a specific example of implementation of the present invention.

Another way of reducing the processing time of the correlation operation is to take advantage of the linear properties of the Fourier transform. By dividing the particular image into several sub-images, a composite image can be formed, herein referred to as a mosaic. When a mosaic is displayed at the input of the correlator, the correlation is computed simultaneously on all the sub-images without incurring any substantial time penalty. A mosaic may contain several different target objects or several different orientations of the same target object or a combination of both. FIG. 7 depicts a mosaic including a target object in various orientations and scales. The parallel processing capabilities of a mosaic effectively increase the throughput of an optical correlator. The reader is invited to refer to the following document for additional information regarding the use of a mosaic in an optical correlator: *Method and apparatus for evaluating a scale factor and a rotation angle in image processing*, Alain Bergeron et al., U.S. Pat. No. 6,549,683, Apr. 15, 2003, the contents of which are incorporated herein by reference.

Figure 9:
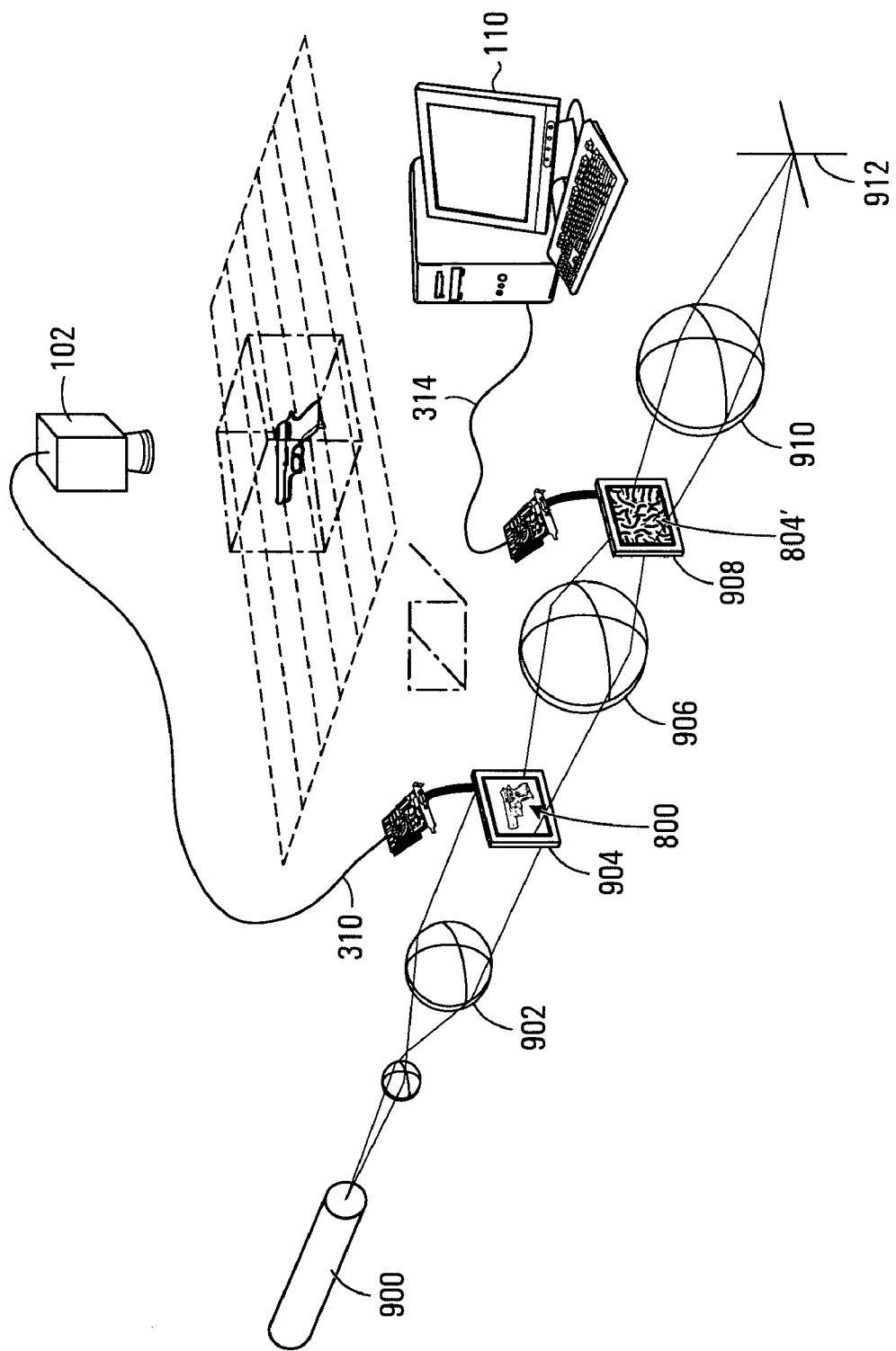
FIG. 9 is a block diagram depicting the functioning of the optical correlator in accordance with a specific example of implementation of the present invention.

The inner workings of the aforementioned non-limiting example optical correlator are illustrated in FIG. 9. On the left hand side appears a laser source 900 that generates a collimated coherent light beam used to project images across the correlator. The light beam is directed first through a small set of lenses 902 used to expand its diameter in order to illuminate, in parallel, the whole surface of a first liquid crystal display (LCD) screen 904. The input image 800 related to the contents of the receptacle 104 is displayed on the first LCD screen 904 either through a direct camera interface or provided as a VGA image by a computing device. The first LCD screen 904 is illuminated by the light beam and the image is propagated through the correlator. In the illustrated example, the input image 800 related to the contents of the receptacle 104, which is captured by the camera is that of a gun on a conveyor belt.

The light beam modulated by the first image on the first LCD screen 904 is then propagated through a second set of lenses 906, referred to as a Fourier lens since it performs the equivalent of the Fourier transform mathematical operation. The inherent properties of light are used to physically perform the appropriate calculations. Specifically, the propagation of light is a function which corresponds to the kernel of the Fourier transform operation, thus the propagation of light along the axis of a Fourier lens represents a sufficiently strong approximation of this natural phenomenon to assert that the light beam undergoes a Fourier transform. Otherwise stated, a lens has the inherent property of performing a Fourier transform on images observed at its front focal plane, provided that this image is displayed at its back focal plane. The Fourier transform, which can normally be rather computation-intensive when calculated by a digital computer, is performed in the optical correlator simply by the propagation of the light. The mathematics behind this optical realization is equivalent to the exact Fourier transform function and can be modeled with standard fast Fourier algorithms. For more information regarding Fourier transforms, the reader is invited to consider B. V. K. Vijaya Kumar, Marios Savvides, Krithika Venkataramani, and Chunyan Xie , "Spatial frequency domain image processing for biometric recognition", Biometrics ICIP Conference 2002 or alternatively J. W. Goodman, Introduction to Fourier Optics, 2nd Edition, McGraw-Hill, 1996. The contents of these documents are incorporated herein by reference.

After going through the Fourier lens 906, the signal is projected on a second LCD screen 908 on which is displayed the target template (or filter) 804' (i.e., Fourier transform) for the particular image 804. When the Fourier transform of the image associated with the receptacle 104 goes through the second LCD screen 908 on which the target template (or filter) 804' is displayed, the light beam crosses a second Fourier lens 910 which, again, optically computes the equivalent of a Fourier transform multiplication. This operation corresponds to a correlation in the spatial domain. The template (or filter) 804' displayed on the second LCD screen 908 in fact induces a phase variation on the incoming light beam. Each pixel can potentially induce a phase change whose magnitude is equivalent to its gray level. As such the Fourier transform displayed on the first LCD screen 904 is multiplied with the Fourier transform of the template (or filter) 804' for the particular image 804, which is equivalent to performing a correlation.

The second Fourier lens 910 finally concentrates the light beam on a small area camera or camera 912 where the result of the correlation is measured, so to speak. The camera 912 in fact measures energy peaks on the correlation plane. The position of a correlation peak corresponds in fact to the location of the target object center in the input image 800.

Referring back to FIG. 8C, the camera 912 communicates the signal from the optical correlator to the detection signal generator module 306. In this specific implementation, the detection signal generator module 306 is a computing unit including a frame grabber and software. The software is adapted to processing the signal received from the camera 912 to detect energy peaks as gray level video signals varying between 0 and 255. A strong intensity peak on the correlation plane indicates a match between the input image 800 related to the contents of the receptacle 104 and the particular image 804 on which the particular template 804' is based. The location of the energy peak also indicates the location of the center of the particular image 804 in the input image 800 related to the contents of the receptacle 104.

Fourier Transform and Spatial Frequencies

The Fourier transform as applied to images will now be described in general terms. The Fourier transform is a mathematical tool used to convert the information present within an object's image into its frequency representation. In short, an image can be seen as a superposition of various spatial frequencies and the Fourier transform is a mathematical operation used to compute the intensity of each of these frequencies within the image. The spatial frequencies represent the rate of variation of image intensity in space. Consequently, a smooth or uniform pattern mainly contains low frequencies. Sharply contoured patterns, by contrast, exhibit a higher frequency content.

The Fourier transform of an image f(x,y) is given by:

$$F(u,v)=\iint f(x,y)e^{-j2\pi(ux+vy)}dxdy \quad (1)$$

where u, v are the coordinates in the frequency domain. Thus, the Fourier transform is a global operator: changing a single frequency of the Fourier transform affects the whole object in the spatial domain.

A correlation operation can be mathematically described by:

$$C(\varepsilon,\xi) = \int_{-\infty}^{\infty}\int_{-\infty}^{\infty} f(x,y)h^*(x-\varepsilon, y-\xi)dxdy \quad (2)$$

where $\varepsilon$ and $\xi$ represent the pixel coordinates in the correlation plane, $C(\varepsilon,\xi)$ stands for the correlation, x and y identify the pixel coordinates of the input image, f(x, y) is the original input image and $h^*(\varepsilon,\xi)$ is the complex conjugate of the correlation filter.

In the frequency domain the same expression takes a slightly different form:

$$C(\varepsilon,\xi)=\Im^{-1}(F(u,v)H^*(u,v)) \quad (3)$$

where $\Im$ is the Fourier transform operator, u and v are the pixel coordinates in the Fourier plane, F(u,v) is the Fourier transform complex conjugate of the image acquired with the camera f(x,y) and H*(u,v) is the Fourier transform of the template (or filter). Thus, the correlation between an input image and a template (or filter) is equivalent, in mathematical terms, to the multiplication of their respective Fourier transforms, provided that the complex conjugate of the template (or filter) is used. Consequently, the correlation can be defined in the spatial domain as the search for a given pattern (template/filter), or in the frequency domain, as filtering operation with a specially designed matched filter.

Advantageously, the use of optics for computing a correlation operation allows the computation to be performed in a shorter time than by using a digital implementation of the correlation. It turns out that an optical lens properly positioned (i.e. input and output images are located on the lens's focal planes) automatically computes the Fourier transform of the input image. In order to speed up the computation of the correlation, the Fourier transform of a particular image can be computed beforehand and submitted to the correlator as a template (or filter). This type of filter is called a matched filter.

Figure 10:
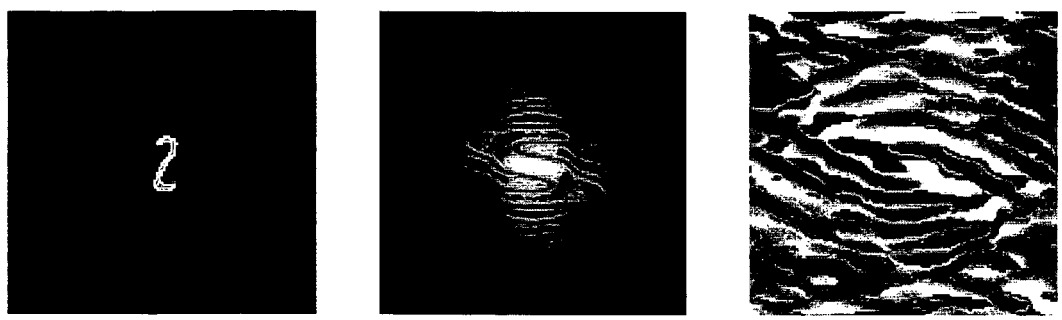
FIG. 10 depicts a Fourier transform, amplitude and phase, of the spatial domain image for number 2.

FIG. 10 depicts the Fourier transform of the spatial domain image of a number '2'. It can be seen that most of the energy (bright areas) is contained in the central portion of the Fourier transform image which correspond to low spatial frequencies (the images are centred on the origin of the Fourier plane). The energy is somewhat more dispersed in the medium frequencies and is concentrated in orientations representative of the shape of the input image. Finally, little energy is contained in the upper frequencies. The right-hand-side image shows the phase content of the Fourier transform. The phase is coded from black (0°) to white (360°).

Generation of Templates (or Filters)

Matched filters, as their name implies, are specifically adapted to respond to one image in particular: they are optimized to respond to an object with respect to its energy content. Generally, the contour of an object corresponds to its high frequency content. This can be easily understood as the contour represent areas where the intensity varies rapidly (hence a high frequency).

In order to emphasize the contour of an object, the matched filter can be divided by its module (the image is normalized), over the whole Fourier transform image. The resulting filter is called a Phase-Only Filter (POF) and is defined by:

$$POF(u,v) = \frac{H^*(u,v)}{|H^*(u,v)|} \quad (4)$$

The reader is invited to refer to the following document for additional information regarding phase only filters (POF): "*Phase-Only Matched Filtering*", Joseph L. Homer and Peter D. Gianino, Appl. Opt. Vol. 23 no. 6, 15 Mar. 1994, pp. 812-816. The contents of this document are incorporated herein by reference.

Because these filters are defined in the frequency domain, normalizing over the whole spectrum of frequencies implies that each of the frequency components is considered with the same weight. In the spatial domain (e.g. usual real-world domain), this means that the emphasis is given to the contours (or edges) of the object. As such, the POF filter provides a higher degree of discrimination, sharper correlation peaks and higher energy efficiency.

The discrimination provided by the POF filter, however, has some disadvantages. It turns out that, although the optical correlator is somewhat insensitive to the size of the objects to be recognized, the images are expected to be properly sized, otherwise the features might not be registered properly. To understand this requirement, imagine a filter defined out of a given instance of a '2'. If that filter is applied to a second instance of a '2' whose contour is slightly different, the correlation peak will be significantly reduced as a result of the great sensitivity of the filter to the original shape. A different type of filter, termed a composite filter, was introduced to overcome these limitations. The reader is invited to refer to the following document for additional information regarding this different type of composite filter: H. J. Caufield and W. T. Maloney, *Improved Discrimination in Optical Character Recognition*, Appl. Opt., 8, 2354, 1969. The contents of this document are incorporated herein by reference.

In accordance with specific implementations, filters can be designed by:
- Appropriately choosing one specific instance (because it represents characteristics which are, on average, common to all symbols of a given class) of a symbol and calculating from that image the filter against which all instances of that class of symbols will be compared; or
- Averaging many instances of a given to create a generic or 'template' image from which the filter is calculated. The computed filter is then called a composite filter since it incorporates the properties of many images (note that it is irrelevant whether the images are averaged before or after the Fourier transform operator is applied, provided that in the latter case, the additions are performed taking the Fourier domain phase into account).

The latter procedure forms the basis for the generation of composite filters. Thus composite filters are composed of the response of individual POF filters to the same symbol. Mathematically, this can be expressed by:

$$h_{comp}(x,y)=\alpha_a h_a(x,y)+\alpha_b h_b(x,y)+K+\alpha_x h_x(x,y) \quad (5)$$

A filter generated in this fashion is likely to be more robust to minor signature variations as the irrelevant high frequency features will be averaged out. In short, the net effect is an equalization of the response of the filter to the different instances of a given symbol.

Composite filters can also be used to reduce the response of the filter to the other classes of symbols. In equation (5) above, if the coefficient b, for example, is set to a negative value, then the filter response to a symbol of class b will be significantly reduced. In other words, the correlation peak will be high if $h_a(x,y)$ is at the input image, and low if $h_b(x,y)$ is present at the input. A typical implementation of composite filters is described in: *Optical Character Recognition (OCR) in Uncontrolled Environments Using Optical Correlators*, Andre Morin, Alain Bergeron, Donald Prevost and Ernst A. Radloff, Proc. SPIE Int. Soc. Opt. Eng. 3715, 346 (1999). The contents of this document are incorporated herein by reference.

Figure 11:
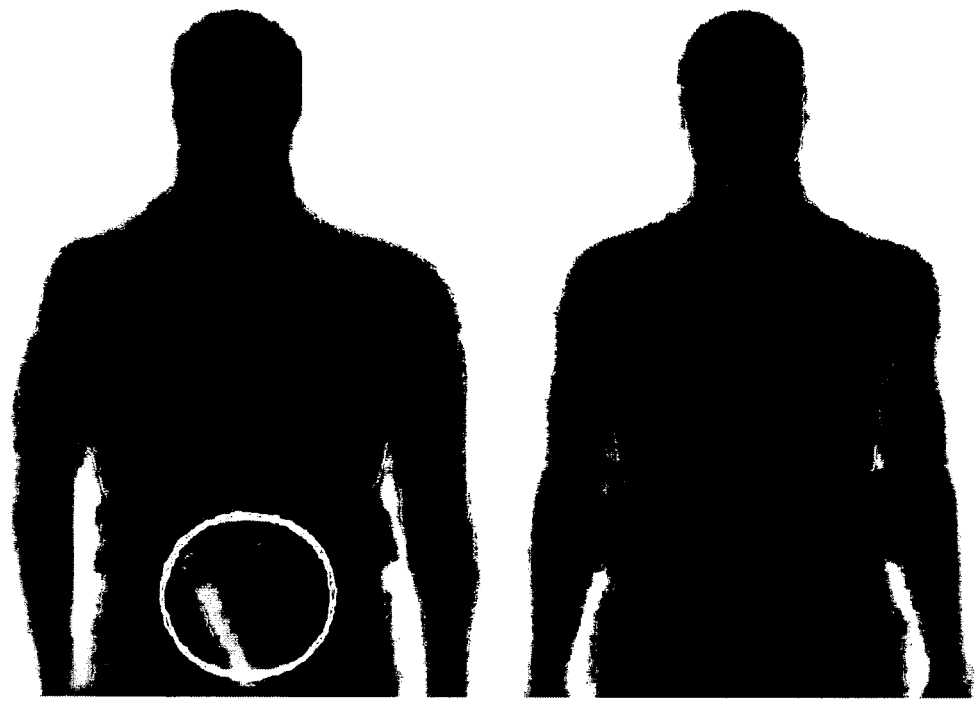
FIG. 11 shows two images associated with a person suitable for use in a system for screening a person in accordance with a specific example of implementation of the present invention.

Those skilled in the art will appreciate that the concepts described above can also be readily applied to the screening of people. For example, in an alternative embodiment, a system for screening people is provided. The system includes components similar to those described in connection with the system depicted in FIG. 1. In a specific example of implementation, the image generation device 102 is configured to scan a person and possibly to scan the person along various axes to generate multiple images associated with the person. The image(s) associated with the person convey information related to the objects carried by the person. FIG. 11 depicts two images associated with a person suitable for use in connection with a specific implementation of the system. Each image is then processed in accordance with the method described in the present specification to detect the presence of target objects on the person.

Figure 12:
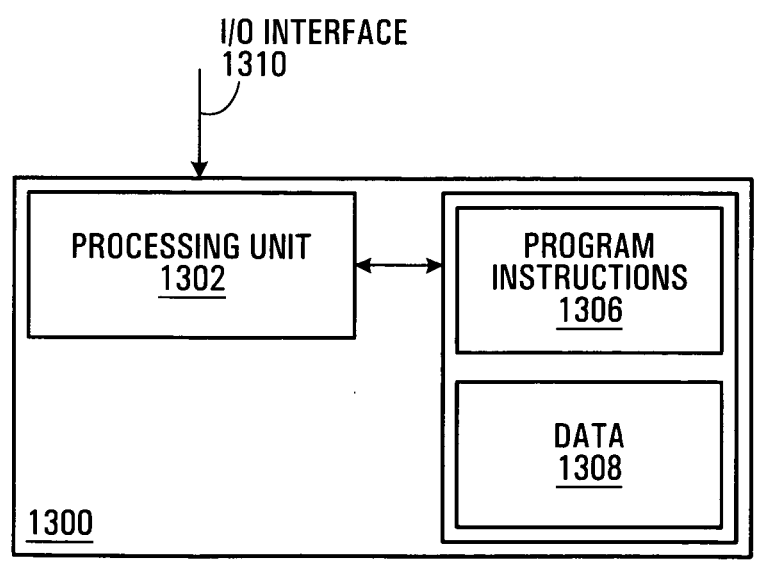
FIG. 12 is a block diagram of an apparatus suitable for implementing at least a portion of the modules depicted in connection with the apparatus for processing images shown in FIG. 3 in accordance with a specific example of implementation of the present invention.

Those skilled in the art will appreciate that certain portions of the apparatus 106 can be implemented on a general purpose digital computer 1300, of the type depicted in FIG. 12, including a processing unit 1302 and a memory 1304 connected by a communication bus. The memory includes data 1308 and program instructions 1306. The processing unit 1302 is adapted to process the data 1308 and the program instructions 1306 in order to implement the functional blocks described in the specification and depicted in the drawings. The digital computer 1300 may also comprise an I/O interface 1310 for receiving or sending data elements to external devices.

Alternatively, the above-described apparatus 106 can be implemented on a dedicated hardware platform where electrical/optical components implement the functional blocks described in the specification and depicted in the drawings. Specific implementations may be realized using ICs, ASICs, DSPs, FPGAs, an optical correlator, digital correlator or other suitable hardware platform.

In a specific example of implementation, the optical correlator suitable for use in the system described herein includes a video input and a digital input. The video input is suitable for receiving a signal derived from an image generation device and the digital input is suitable for receiving a signal derived from images in a database. In a specific implementation, the video input is suitable for receiving a signal in an NTSC compatible format and the digital input suitable for receiving a signal in a VGA compatible format. It will be appreciated that the digital input suitable for receiving a signal in a VGA compatible format may be replaced by any other suitable digital input interface adapted for receiving signals of lower or higher resolution that the VGA compatible format signal. Similarly, it will also be appreciated that the video input suitable for receiving a signal in an NTSC compatible format may be replaced by any other suitable analog or digital video signal interface suitable for receiving signals in suitable formats such as, but not limited to, PAL and SECAM. In a non-limiting implementation, the optical correlator is adapted to process an image received at the video input having an area of 640×480 pixels. However, it will be readily apparent that, by providing suitable interfaces, larger or smaller images can be handled since the optical correlator's processing capability is independent of the size of the image, as opposed to digital systems that require more processing time and power as images get larger. In yet another alternative implementation, the video input is replaced by a second digital input adapted for receiving an image signal in any suitable digital image format. In such an implementation, the image generation device 102 (shown in FIG. 1) generates a digital format image and communicates the latter to the apparatus 106. Advantageously, by providing a digital machine-to-machine exchange of images between the image generation device 102 and the apparatus 106, the digital image generated by the image generation device 102 can be processed directly without the requirement of effecting an analog-to-digital conversion at the apparatus 106.

In a variant, a single optical correlator can be shared by multiple image generation devices. In such a variant, conventional parallel processing techniques can be used for sharing a common hardware resource.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. An apparatus suitable for screening a receptacle, said apparatus comprising:
    a) an input for receiving an image signal conveying an input image related to contents of the receptacle, the image signal having been produced by subjecting the receptacle to penetrating radiation using a device having a radiation source and radiation detectors, the device being characterized by introducing distortion into the input image so that the input image signal conveys a distorted representation of the receptacle and its contents, wherein part of the distortion introduced in the input image is dependent on a location of the receptacle relative to the radiation source and radiation detectors while the receptacle was being subjected to penetrating radiation;
    b) a processing unit in communication with said input, said processing unit being programmed for:
        applying a distortion correction process to the image signal to remove at least in part from the input image the part of the distortion dependent on the location of the receptacle relative to the radiation source and radiation detectors while the receptacle was being subjected to penetrating radiation, thereby to generate a corrected image signal related to contents of the receptacle, the corrected image signal conveying a modified representation of the receptacle and its contents, wherein applying the distortion correction process to the image signal includes:
            selecting a candidate height from a range of possible heights, the possible heights in said range being related to respective locations relative to the radiation source and detectors of the device; and
            using the selected candidate height to condition the distortion correction process applied to the image signal;
        processing the corrected image signal in an attempt to detect a presence in the receptacle of a target object;

generating a detection signal in response to detection of the presence of the target object in the receptacle;

c) an output for releasing the detection signal.

2. The apparatus defined in claim 1, wherein the processing unit is programmed for applying the distortion correction process to the image signal multiple times, each application of the distortion correction process:

a) being associated with a respective candidate height; and b) generating a respective corrected image signal conveying a corresponding corrected representation of the receptacle and its contents.

3. The apparatus defined in claim 1, wherein the input image signal is defined by intensity data for a set of observed coordinates, wherein the corrected image signal is defined by modified intensity data for a set of new coordinates, and wherein applying the distortion correction process comprises applying an image transformation to the intensity data for the set of observed coordinates to derive said modified intensity data for the new coordinates.

4. The apparatus defined in claim 3, wherein said image transformation involves processing of a data structure representative of an inferred spatial transformation applied by the device.

5. The apparatus defined in claim 3, wherein the processing unit is programmed for applying the image transformation to the input image signal multiple times, each application of the image transformation being associated with a respective candidate height and involving processing of a data structure representative of an inferred spatial transformation applied by the device for objects at the respective candidate height.

6. The apparatus defined in claim 4, wherein said inferred spatial transformation is two-dimensional.

7. The apparatus defined in claim 4, wherein said data structure is characterized by a set of parameters derived from registration of the observed coordinates with respect to a set of original coordinates.

8. The apparatus defined in claim 1, wherein the receptacle is a luggage item.

9. The apparatus defined in claim 1, wherein the receptacle is a cargo container.

10. The apparatus defined in claim 1, wherein the receptacle is a mail parcel.

11. The apparatus defined in claim 1, wherein processing the corrected image signal to detect the presence in the receptacle of the target object includes processing the corrected image signal in combination with an image of the target object.

12. The apparatus defined in claim 1, processing the corrected image signal to detect the presence in the receptacle of the target object includes processing the corrected image signal in combination with a Fourier transform of an image if the target object.

13. The apparatus defined in claim 1, wherein said image signal is an x-ray image.

14. The apparatus defined in claim 1, wherein the detection signal conveys the presence of the target object in the receptacle.

15. The apparatus defined in claim 1, wherein the detection signal enables identification of the target object whose presence in the receptacle was detected.

16. The apparatus defined in claim 1, wherein the detection signal conveys a data element identifying the target object whose presence in the receptacle was detected.

17. The apparatus defined in claim 1, wherein the detection signal conveys information describing at least one characteristic of the target object whose presence in the receptacle was detected.

18. The apparatus defined in claim 17, wherein the at least one characteristic comprises position information.

19. The apparatus defined in claim 1, wherein said detection signal is operative for causing a display unit to convey information related to the target object whose presence in the receptacle was detected.

20. The apparatus defined in claim 1, wherein said processing unit is responsive to detection of the presence the target object in the receptacle to:

a) generate log information elements conveying a presence of the target object whose presence in the receptacle was detected;

b) store said log information data elements on a computer readable storage medium.

21. The apparatus defined in claim 20, wherein said log information elements include a time stamp data element.

22. The apparatus defined in claim 1, wherein said processing unit performs a correlation operation between data derived from the corrected image signal and data derived from an image of the target object in order to detect the presence of the target object in the receptacle.

23. The apparatus defined in claim 22, wherein said processing unit comprises an optical correlator for effecting the correlation operation.

24. The apparatus defined in claim 22, wherein said processing unit comprises a digital correlator for effecting the correlation operation.

25. The apparatus defined in claim 1, wherein the input image related to the contents of the receptacle is two-dimensional.

26. The apparatus defined in claim 1, wherein the input image related to the contents of the receptacle is three-dimensional.

27. The apparatus defined in claim 1, wherein said image signal is in a format selected from the set consisting of VGA, SVGA and XGA.

28. The apparatus defined in claim 1, wherein said input image is in a format selected from the set consisting of JPEG, GIF, TIFF and bitmap.

29. The apparatus defined in claim 1, wherein the target object is a weapon.

30. A method for screening a receptacle, said method comprising:

a) receiving an image signal conveying an input image related to contents of the receptacle, the image signal having been produced by subjecting the receptacle to penetrating radiation using a device having a radiation source and radiation detectors, the device being characterized by introducing distortion into the input image, so that the input image signal conveys a distorted representation of the receptacle and its contents, wherein part of the distortion introduced in the input image is dependent on a location of the receptacle relative to the radiation source and radiation detectors while the receptacle was being subjected to penetrating radiation;

b) applying a distortion correction process to the image signal to remove at least in part from the input image the part of the distortion dependent on the location of the receptacle relative to the radiation source and radiation detectors while the receptacle was being subjected to penetrating radiation, thereby to generate a corrected image signal related to contents of the receptacle, the corrected image signal conveying a modified representation of the receptacle and its contents, wherein applying the distortion correction process to the image signal includes:

i. selecting a candidate height from a range of possible heights, the possible heights in said range being related to respective locations relative to the radiation source and detectors of the device; and
ii. using the selected candidate height to condition the distortion correction process applied to the image signal;

c) processing the corrected image signal in an attempt to detect a presence in the receptacle of a target object;
d) generating a detection signal in response to detection of the presence of the target object in the receptacle;
e) releasing the detection signal.

31. The method defined in claim 30, wherein said method comprises applying the distortion correction process to the image signal multiple times, each application of the distortion correction process:
a) being associated with a respective candidate height; and
b) generating a respective corrected image signal conveying a corresponding corrected representation of the receptacle and its contents.

32. The method defined in claim 30, wherein the input image is defined by intensity data for a set of observed coordinates, wherein the corrected image is defined by modified intensity data for a set of new coordinates, and wherein applying the distortion correction process comprises applying an image transformation to the intensity data for the set of observed coordinates to derive said modified intensity data for the new coordinates.

33. The method defined in claim 32, wherein said image transformation involves processing of a data structure representative of an inferred spatial transformation applied by the device.

34. The method defined in claim 32, wherein said method comprises applying the image transformation to the input image multiple times, each application of the image transformation being associated with a respective candidate height within the receptacle and involving processing of a data structure representative of an inferred spatial transformation applied by the device for objects at the respective candidate height.

35. The method defined in claim 33, wherein said inferred spatial transformation is two-dimensional.

36. The method defined in claim 33, wherein said data structure is characterized by a set of parameters derived from registration of the observed coordinates with respect to a set of original coordinates.

37. The method defined in claim 30, wherein processing the corrected image signal to detect the presence in the receptacle of the target object includes processing the corrected image signal in combination with an image of the target object.

38. The method defined in claim 30, processing the corrected image signal to detect the presence in the receptacle of the target object includes processing the corrected image signal in combination with a Fourier transform of an image of the target object.

39. The method defined in claim 30, wherein said image signal is an x-ray image.

40. The method defined in claim 30, wherein the detection signal conveys the presence of the target object in the receptacle.

41. The method defined in claim 30, wherein the detection signal enables identification of the target object whose presence in the receptacle was detected.

42. The method defined in claim 30, wherein the detection signal conveys a data element identifying the target object whose presence in the receptacle was detected.

43. The method defined in claim 30, wherein the detection signal conveys information describing at least one characteristic of the target object whose presence in the receptacle was detected.

44. The method defined in claim 43, wherein the at least one characteristic comprises position information.

45. The method defined in claim 30, further comprising causing a display unit to convey information related to the target object whose presence in the receptacle was detected.

46. The method defined in claim 30, further comprising, in response to detection of the presence of the target object in the receptacle:
a) generating log information elements conveying a presence of the target object whose presence in the receptacle was detected;
b) storing said log information data elements on a computer readable storage medium.

47. The method defined in claim 46, wherein said log information elements include a time stamp data element.

48. The method defined in claim 30, wherein said method comprises performing a correlation operation between data derived from the corrected image signal and data derived from an image of the target object in order to detect the presence of the target object in the receptacle.

49. The method defined in claim 48, wherein said correlation operation is effected by an optical correlator.

50. The method defined in claim 48, wherein said correlation operation is effected by a digital correlator.

51. The method defined in claim 30, wherein the input image related to the contents of the receptacle is two-dimensional.

52. The method defined in claim 30, wherein the input image related to the contents of the receptacle is three-dimensional.

53. The method defined in claim 30, wherein said image signal is in a format selected from the set consisting of VGA, SVGA and XGA.

54. The method defined in claim 30, wherein said input image is in a format selected from the set consisting of JPEG, GIF, TIFF and bitmap.

55. The method defined in claim 30, wherein the target object is a weapon.

56. A non-transitory computer-readable medium comprising computer-readable program code which, when interpreted by a computing apparatus, causes the computing apparatus to execute a method of screening a receptacle, the computer-readable program code comprising:
first computer-readable program code for causing the computing apparatus to be attentive to receipt of an image signal conveying an input image related to contents of the receptacle, the image signal having been produced by subjecting the receptacle to penetrating radiation using a device having a radiation source and radiation detectors, the device being characterized by introducing distortion into the input image so that the input image signal conveys a distorted representation of the receptacle and its contents, wherein part of the distortion introduced in the input image is dependent on a location of the receptacle relative to the radiation source and radiation detectors while the receptacle was being subjected to penetrating radiation;
second computer-readable program code for causing the computing apparatus to apply a distortion correction process to the image signal to remove at least in part from the second computer-readable program code for causing the computing apparatus to apply a distortion correction process to the image signal to remove at least in part from the input image the part of the distortion dependent on the location of the receptacle relative to the radiation source and radiation detectors while the receptacle was being subjected to penetrating radiation, thereby to generate a corrected image signal related to contents of the receptacle, the corrected image signal conveying a modified representation of the receptacle and its contents, wherein applying the distortion correction process to the image signal includes:

selecting a candidate height from a range of possible heights, the possible heights in said range being related to respective locations relative to the radiation source and detectors of the device; and using the selected candidate height to condition the distortion correction process applied to the image signal;

third computer-readable program code for causing the computing apparatus to process the corrected image signal in an attempt to detect a presence of a target object in the receptacle;

fourth computer-readable program code for causing the computing apparatus to generate a detection signal in response to detection of the presence of the target object in the receptacle;

fifth computer-readable program code for causing the computing apparatus to release the detection signal.

57. An apparatus for screening a receptacle, comprising:
a) means for receiving an image signal conveying an input image related to contents of the receptacle, the image signal having been produced by subjecting the receptacle to penetrating radiation using a device having a radiation source and radiation detectors, the device being characterized by introducing distortion into the input image so that the input image signal conveys a distorted representation of the receptacle and its contents, wherein part of the distortion introduced in the input image is dependent on a location of the receptacle relative to the radiation source and radiation detectors while the receptacle was being subjected to penetrating radiation;
b) means for applying a distortion correction process to the image signal to remove at least in part from the input image the part of the distortion dependent on the location of the receptacle relative to the radiation source and radiation detectors while the receptacle was being subjected to penetrating radiation, thereby to generate a corrected image signal related to contents of the receptacle, the corrected image signal conveying a modified representation of the receptacle and its contents, said means for applying the distortion correction process being configured for:
   i. selecting a candidate height from a range of possible heights, the possible heights in said range being related to respective locations relative to the radiation source and detectors of the device; and
   ii. using the selected candidate height to condition the distortion correction process applied to the image signal;
c) means for processing the corrected image signal in an attempt to detect a presence of a target object in the receptacle;
d) means for generating a detection signal in response to detection of the presence of the target object in the receptacle;
e) means for releasing the detection signal.

58. A system for screening a receptacle, comprising:
a) an image generation device having a radiation source and radiation detectors and operable to generate an image signal conveying an input image related to contents of the receptacle subjecting the receptacle to penetrating radiation, the input image containing distortion introduced by said image generation device so that the input image signal conveys a distorted representation of the receptacle and its contents, wherein part of the distortion introduced in the input image is dependent on a location of the receptacle relative to the radiation source and radiation detectors while the receptacle was being subjected to penetrating radiation;
b) an apparatus in communication with said image generation device, said apparatus including a processor programmed for:
   applying a distortion correction process to the image signal to remove at least in part from the input image the part of the distortion dependent on the location of the receptacle relative to the radiation source and radiation detectors while the receptacle was being subjected to penetrating radiation, thereby to generate a corrected image signal related to contents of the receptacle, the corrected image signal conveying a modified representation the receptacle and its contents, wherein applying the distortion correction process to the image signal includes:
      selecting a candidate height from a range of possible heights, the possible heights in said range being related to respective locations relative to the radiation source and detectors of the device; and
      using the selected candidate height to condition the distortion correction process applied to the image signal;
   processing the corrected image signal in an attempt to detect a presence of a target object in the receptacle;
   generating a detection signal in response to detection of the presence of the target object in the receptacle;
c) an output module for conveying information derived at least in part on the basis of said detection signal to a user of the system.

59. A system as defined in claim 58, wherein the image generation device uses penetrating radiation to generate said image signal.

60. A system as defined in claim 59, wherein the penetrating radiation is selected from the set consisting of x-ray, gamma-ray, computed tomography (CT scans) and millimeter wave.

61. An apparatus for screening a suitcase to determine if the suitcase contains a concealed firearm, the apparatus comprising:
a) an input for receiving an X-ray image signal, the X-ray image signal conveying an image of the suitcase being produced by subjecting the suitcase to penetrating radiation using an X-ray imaging device having a radiation source and radiation detectors, wherein objects in the suitcase have distorted shapes in the image and wherein part of the distortion introduced in the input image is dependent on a location of the suitcase relative to the radiation source and the radiation detectors while the suitcase was being subjected to penetrating radiation;
b) a computer based processing unit in communication with said input, said processing unit being programmed for:
   i. applying a distortion correction process to the X-ray image signal to generate a corrected X-ray image signal, the corrected X-ray image signal conveying an image of the suitcase in which a correction has been applied to the distorted shapes, the correction applied removing at least in part the part of the distortion dependent on the location of the suitcase relative to the radiation source and the radiation detectors while the suitcase was being subjected to penetrating radiation, wherein applying the distortion correction process to the X-ray image signal includes:
(i) selecting a candidate height from a range of possible heights, the possible heights in said range being related to respective locations relative to the radiation source and detectors of the device; and
(ii) using the selected candidate height to condition the distortion correction process applied to the X-ray image signal;

ii. processing the corrected X-ray image signal with a shape matching algorithm to determine if an object in the image matches anyone of a plurality of firearm shapes stored in a database of shapes;
iii. generating a detection signal when a firearm shape is detected in the image;
c) an output for releasing the detection signal.

* * * * *